US012806739B2

(12) United States Patent
Baker et al.

(10) Patent No.: US 12,806,739 B2
(45) Date of Patent: Nov. 24, 2026

(54) PRECISION ADJUST SHARPENER

(71) Applicant: Darex, LLC, Ashland, OR (US)

(72) Inventors: Steven L. Baker, Medford, OR (US); Joseph T. Zachariasen, Medford, OR (US); Daniel T. Dovel, Shady Cove, OR (US)

(73) Assignee: DAREX, LLC, Ashland, OR (US)

( * ) Notice: Subject to any disclaimer, the term of this patent is extended or adjusted under 35 U.S.C. 154(b) by 456 days.

(21) Appl. No.: 18/494,990

(22) Filed: Oct. 26, 2023

(65) Prior Publication Data

US 2024/0051088 A1 Feb. 15, 2024

Related U.S. Application Data

(63) Continuation of application No. 17/967,488, filed on Oct. 17, 2022, now Pat. No. 11,883,930, which is a (Continued)

(51) Int. Cl.
*B24D 15/08* (2006.01)
*B25B 5/04* (2006.01)
*B25B 11/02* (2006.01)

(52) U.S. Cl.
CPC ................ *B24D 15/08* (2013.01); *B25B 5/04* (2013.01); *B25B 11/02* (2013.01)

(58) Field of Classification Search
CPC ........... B24B 19/002; B24B 3/00; B24B 3/36; B24B 3/52; B24B 3/54; B24B 3/546;
(Continued)

(56) References Cited

U.S. PATENT DOCUMENTS

| | | | |
|---|---|---|---|
| 90,433 | A | 5/1869 | Dinsmore |
| 308,046 | A | 11/1884 | Williams |

(Continued)

FOREIGN PATENT DOCUMENTS

| | | | |
|---|---|---|---|
| AU | 204125 | B2 | 2/1956 |
| CN | 102069426 | A | 5/2011 |

(Continued)

OTHER PUBLICATIONS

KR102119520—Machine Translation (Year: 2020).*
(Continued)

*Primary Examiner* — Brian D Keller
*Assistant Examiner* — Alberto Saenz
(74) *Attorney, Agent, or Firm* — Workman Nydegger

(57) ABSTRACT

Method and apparatus for sharpening a cutting edge of a cutting tool, such as a kitchen knife. A fixture secures opposing sides of a blade of the cutting tool and includes a main body and hinged first and second clamping jaws each having a clamping end adapted to compressingly engage a respective side of the blade. A guide coupled to the main body has converging support surfaces to contactingly engage a back edge (spine) of the blade opposite the cutting edge to center the blade along a central plane of the fixture. A retraction mechanism establishes a clamping force upon each of the respective sides of the blade via the clamping jaws. Further embodiments include a base assembly adapted to receive the fixture, and a swing arm style abrasive assembly to carry out a sharpening operation upon the cutting edge.

19 Claims, 22 Drawing Sheets

Related U.S. Application Data continuation of application No. 17/473,380, filed on Sep. 13, 2021, now Pat. No. 11,498,186.

(60) Provisional application No. 63/198,004, filed on Sep. 23, 2020.

(58) Field of Classification Search
CPC ....... B24B 3/605; B24B 41/06; B24B 41/066; B24D 15/08; B25B 5/04; B25B 11/02
USPC ......... 451/45, 175, 321, 322, 371, 372, 552, 451/555; 76/82, 82.2, 84, 86; 7/120; 30/138, 139
See application file for complete search history.

(56) References Cited

U.S. PATENT DOCUMENTS

| | | | | | |
|---|---|---|---|---|---|
| 523,908 | A | | 7/1894 | Sly | |
| 606,000 | A | | 6/1898 | Clark | |
| 699,890 | A | | 5/1902 | Mcleran | |
| 1,039,831 | A | | 10/1912 | Sisson | |
| 1,081,283 | A | | 12/1913 | Flinker et al. | |
| 1,148,303 | A | | 7/1915 | Farrar | |
| 1,368,218 | A | | 2/1921 | Chenette | |
| 1,453,409 | A | | 5/1923 | Scott | |
| 1,464,442 | A | | 8/1923 | Palser | |
| 1,541,835 | A | | 6/1925 | Edgar | |
| 1,598,147 | A | | 8/1926 | Mickelsen | |
| 1,774,680 | A | | 9/1930 | Thomas | |
| 1,832,968 | A | | 11/1931 | De Armey | |
| 1,890,582 | A | | 12/1932 | Koss, Jr. | |
| 1,904,075 | A | | 4/1933 | Petrich | |
| 1,906,635 | A | | 5/1933 | Schick | |
| 1,935,592 | A | | 11/1933 | Manfred | |
| 1,955,366 | A | * | 4/1934 | Gupton | B24D 15/06 76/82.2 |
| 2,180,230 | A | | 11/1939 | Freeth | |
| 2,191,899 | A | * | 2/1940 | Primak | B24D 15/06 451/175 |
| 2,259,095 | A | | 10/1941 | Aiello, Sr. | |
| 2,528,943 | A | | 11/1950 | Calabrese | |
| 2,557,093 | A | | 6/1951 | Garbarino | |
| 2,604,738 | A | | 7/1952 | Ramey | |
| 2,652,667 | A | | 9/1953 | Arnold | |
| 3,088,252 | A | | 5/1963 | Schmidt | |
| 3,254,630 | A | | 6/1966 | Tufan | |
| 3,280,514 | A | | 10/1966 | Raymond | |
| 3,654,823 | A | | 4/1972 | Juranitch | |
| 3,733,933 | A | | 5/1973 | Longbrake | |
| 3,800,632 | A | | 4/1974 | Juranitch | |
| 3,913,903 | A | | 10/1975 | Seward et al. | |
| 3,924,360 | A | | 12/1975 | Haile et al. | |
| 4,216,627 | A | | 8/1980 | Westrom | |
| 4,217,735 | A | * | 8/1980 | McGeoch | B24D 15/06 451/377 |
| 4,320,892 | A | | 3/1982 | Longbrake | |
| 4,324,157 | A | | 4/1982 | Soutsos | |
| 4,404,873 | A | | 9/1983 | Radish | |
| D273,081 | S | | 3/1984 | Levine | |
| 4,441,279 | A | | 4/1984 | Storm et al. | |
| 4,471,951 | A | | 9/1984 | Levine | |
| 4,486,982 | A | | 12/1984 | Longbrake | |
| 4,497,142 | A | | 2/1985 | Sessoms | |
| D278,237 | S | | 4/1985 | Levine | |
| 4,512,112 | A | | 4/1985 | Levine | |
| 4,538,382 | A | | 9/1985 | Johannsen | |
| D287,815 | S | | 1/1987 | Johannsen | |
| 4,714,239 | A | | 12/1987 | Levine | |
| 4,731,953 | A | | 3/1988 | Owen | |
| 4,777,770 | A | | 10/1988 | Levine | |
| 4,903,438 | A | | 2/1990 | Smith | |
| 5,138,801 | A | | 8/1992 | Anthon et al. | |
| 5,185,958 | A | | 2/1993 | Dale | |
| 5,195,275 | A | | 3/1993 | McLean | |
| D335,621 | S | | 5/1993 | Moody | |
| 5,363,602 | A | | 11/1994 | Anthon et al. | |
| 5,431,068 | A | | 7/1995 | Alsch | |
| D363,202 | S | | 10/1995 | Ross | |
| D363,869 | S | | 11/1995 | Ross | |
| 5,472,375 | A | | 12/1995 | Pugh | |
| 5,547,419 | A | | 8/1996 | Hulnicki | |
| 6,227,958 | B1 | | 5/2001 | Neuberg | |
| 6,579,163 | B1 | | 6/2003 | Ross et al. | |
| 7,052,385 | B1 | | 5/2006 | Swartz | |
| 7,144,310 | B2 | | 12/2006 | Longbrake | |
| 7,182,678 | B2 | | 2/2007 | Keska | |
| 7,867,062 | B2 | | 1/2011 | Swartz | |
| 7,874,896 | B1 | | 1/2011 | Watson | |
| D640,115 | S | | 6/2011 | Huff et al. | |
| 8,016,279 | B1 | | 9/2011 | Su | |
| 8,262,438 | B1 | | 9/2012 | Allison et al. | |
| 8,277,291 | B2 | | 10/2012 | Dovel | |
| 8,292,701 | B2 | | 10/2012 | Heng | |
| 8,303,381 | B2 | | 11/2012 | Schwartz | |
| 8,323,077 | B2 | | 12/2012 | Nakoff | |
| 8,998,680 | B1 | | 4/2015 | Dovel | |
| 9,216,488 | B2 | | 12/2015 | Allison | |
| 10,131,028 | B1 | | 11/2018 | Allison | |
| 10,201,884 | B2 | | 2/2019 | Sandefur | |
| D862,194 | S | | 10/2019 | Wood | |
| 10,744,614 | B1 | | 8/2020 | Allison | |
| 11,052,512 | B1 | | 7/2021 | Allison | |
| 11,498,186 | B2 | | 11/2022 | Baker et al. | |
| 11,541,501 | B1 | | 1/2023 | Chen | |
| 11,554,456 | B1 | | 1/2023 | Baker et al. | |
| D977,324 | S | | 2/2023 | Baker et al. | |
| D986,708 | S | | 5/2023 | Baker et al. | |
| D987,402 | S | | 5/2023 | Baker et al. | |
| D992,392 | S | | 7/2023 | Wang | |
| D995,258 | S | | 8/2023 | Wang | |
| D1,054,269 | S | | 12/2024 | Dovel et al. | |
| D1,067,745 | S | | 3/2025 | Xie | |
| D1,087,714 | S | | 8/2025 | Dovel | |
| 2004/0140602 | A1 | | 7/2004 | Gerritsen et al. | |
| 2005/0048885 | A1 | | 3/2005 | Longbrake | |
| 2006/0217046 | A1 | | 9/2006 | Swartz | |
| 2007/0072521 | A1 | | 3/2007 | Tsuchida | |
| 2007/0249268 | A1 | | 10/2007 | Swartz | |
| 2008/0075942 | A1 | | 3/2008 | Gerard et al. | |
| 2010/0187740 | A1 | | 7/2010 | Orgeron | |
| 2011/0024962 | A1 | | 2/2011 | Zhang | |
| 2011/0090072 | A1 | | 4/2011 | Haldeman | |
| 2011/0159791 | A1 | * | 6/2011 | Heng | B24B 3/546 451/349 |
| 2011/0177764 | A1 | | 7/2011 | Schwartz | |
| 2014/0335765 | A1 | | 11/2014 | Allison | |
| 2014/0342644 | A1 | | 11/2014 | Hasegawa | |
| 2017/0320185 | A1 | | 11/2017 | Sandefur | |
| 2018/0236734 | A1 | | 8/2018 | Childers et al. | |
| 2019/0210177 | A1 | | 7/2019 | Graves et al. | |
| 2019/0217557 | A1 | | 7/2019 | Lewit et al. | |
| 2020/0338682 | A1 | | 10/2020 | Allison | |
| 2021/0197343 | A1 | | 7/2021 | Cauley et al. | |
| 2022/0088748 | A1 | | 3/2022 | Baker et al. | |
| 2022/0314389 | A1 | | 10/2022 | Stallegger | |
| 2022/0331926 | A1 | | 10/2022 | Allison | |
| 2023/0033060 | A1 | | 2/2023 | Baker et al. | |
| 2023/0398653 | A1 | | 12/2023 | Allison | |

FOREIGN PATENT DOCUMENTS

| | | | | | |
|---|---|---|---|---|---|
| CN | 110000716 | A | | 7/2019 | |
| CN | 213917356 | U | | 8/2021 | |
| CN | 216781217 | U | | 6/2022 | |
| DE | 0823712 | | | 12/1951 | |
| DE | 2415966 | A1 | | 10/1974 | |
| DE | 102005033806 | A1 | | 8/2006 | |
| DE | 102010002843 | A1 | | 9/2011 | |
| DE | 202016006994 | U1 | | 12/2016 | |
| EP | 1242225 | A2 | | 9/2002 | |
| EP | 1434689 | A2 | | 7/2004 | |
| GB | 1224028 | A | | 3/1971 | |
| JP | 60-176728 | A | | 9/1985 | |
| KR | 102119520 | B1 | * | 6/2020 | B24B 3/52 |

(56) References Cited

FOREIGN PATENT DOCUMENTS

| | | | |
|---|---|---|---|
| WO | 99/56915 | A1 | 11/1999 |
| WO | 01/41992 | A2 | 6/2001 |
| WO | 2004/037488 | A1 | 5/2004 |
| WO | 2017/200431 | A1 | 11/2017 |

OTHER PUBLICATIONS

"Benchtop Knife Sharpener," Cold steel, Retrieved from https://www.coldsteel.com/benchtop-knife-sharpener/#productView-description-ph, Retrieved on Dec. 15, 2023, pp. 3.

"KakBritva Luch Knife Sharpener," Gritomatic, Retrieved from https://www.gritomatic.com/products/kakbritva-luch-knife-sharpener, Retrieved on Dec. 12, 2023, pp. 5.

"Kazak Poland," Retrieved from https://knife.kazak.com.pl/, Retrieved on Nov. 2023, pp. 2.

"Kazak Pro Knife Sharpener Review!," Green Beetle, Retrieved from https://www.youtube.com/watch?v=vHdWdiesCKU, Retrieved on Nov. 2023, pp. 2.

Invitation to Pay Additional Fee received for PCT Patent Application No. PCT/US23/85710, mailed on Mar. 8, 2024, 3 pages.

Office Action received for Chinese Patent Application No. 202330440616.0 , mailed on May 11, 2024, 3 pages (2 pages of English Translation and 1 page of Original Document).

Pofessional Prescision Adjust Knife Sharpener Tool, by Work Sharp, online at amazon.com, URL/: https://www.amazon.com/Sharp-Professional-Precision-Adjust-Sharpener/dp/B0BTTXVQRQ, First available on Sep. 3, 2023, Retrieved on Jan. 19, 2024. (Year: 2023).

"User Manual for the Ermak-10 knife sharpener"; https://sharpeningtool.eu/sites/default/files/temp/instrukcia_e10_en.pdf; obtained from the VETAKO website on Mar. 14, 2022; 6 pages.

How to Get Your Knives Razor Sharp; retrieved from https://knifeinformer.com/how-to-get-your-knives-razor-sharp, Jan. 24, 2023, 5 pages.

U.S. Appl. No. 17/473,380; mailed Jul. 18, 2022; Notice of Allowance.

U.S. Appl. No. 17/743,380; mailed Apr. 4, 2022; Office Action.

International Search Report and Written Opinion received for PCT Patent Application No. PCT/US2021/051292, mailed on Feb. 14, 2022, 23 pages.

International Search Report from corresponding PCT Application No. PCT/US2021/05129, Jan. 6, 2022.

Invitation to Pay Additional Fees received for PCT Patent Application No. PCT/US2021/051292, mailed on Dec. 22, 2021, 19 pages.

Web page for Ermak-5, https://sharpeningtool.eu/product/ermak-5; obtained from the VETAKO website on Dec. 5, 2022; 7 pages.

European Search Report received for EP Patent Application No. 21873203.0, mailed on Sep. 24, 2024, 8 pages.

Office Action received for Chinese Patent Application No. 202190001068.5 mailed on Aug. 8, 2024, 6 pages (4 pages of English Translation and 2 pages of Original Document).

Office Action received for Chinese Patent Application No. 202190001068.5 mailed on Sep. 27, 2024, 1 page.

Office Action received for Chinese Patent Application No. 202420057733.8, mailed on Aug. 21, 2024, 3 pages (2 pages of English Translation and 1 page of Original Document).

European Search Report received for EP Patent Application No. 21958548.6, mailed on May 14, 2025, 10 pages.

International Preliminary Report on Patentability received for PCT Patent Application No. PCT/US2023/085710, Jul. 3, 2025, 7 pages.

Office Action received for Chinese Patent Application No. 202180076986.9, mailed on Jun. 4, 2025, 23 pages.

Work Sharp Sharpeners, "User's Guide for the Professional Precision Adjust Knife Sharpener", Dec. 15, 2022, 17 pages; Retrieved from the internet on Oct. 11, 2024 from https://www.worksharptools.com/cdn/shop/files/PP0005063-Rev-1-Pro-Precision-Adjust-User-Guide_ae53a4b2-085b-4cdb-81d7-033345d0ed0f. pdf?v=8889437319694779902.

Screen capture from Youtube video clip entitled "Work Sharp Professional Precision Adjust *New* | How to Use + Can It Save You Time and Money?," 1 page, uploaded on May 2, 2023 by user "Tactical Tavern Tomas". Retrieved from the internet on Sep. 10, 2025 from https://www.youtube.com/watch?v=XHAyVRDLFfw.

Amazon, "Work Sharp Precision Adjust Elite Knife Sharpener—Adjustable Knife Sharpening System—For Hunting, Serrated & Kitchen Knives", Aug. 10, 2021, 2 pages; Retrieved from the internet on Sep. 10, 2025 from https://www.amazon.com/Work-Sharp-Precision-Additional-Sharpening/dp/B09FWWDFF9.

* cited by examiner

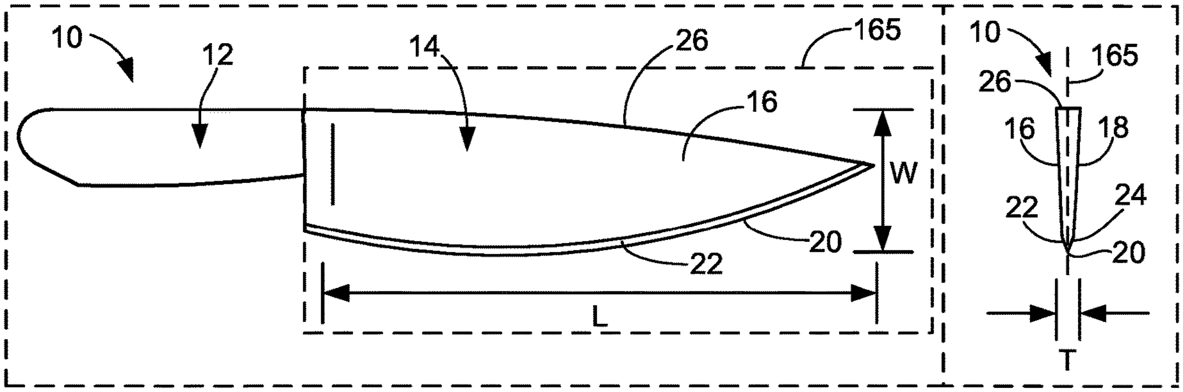
FIG. 1A
Related Art
FIG. 1B
Related Art
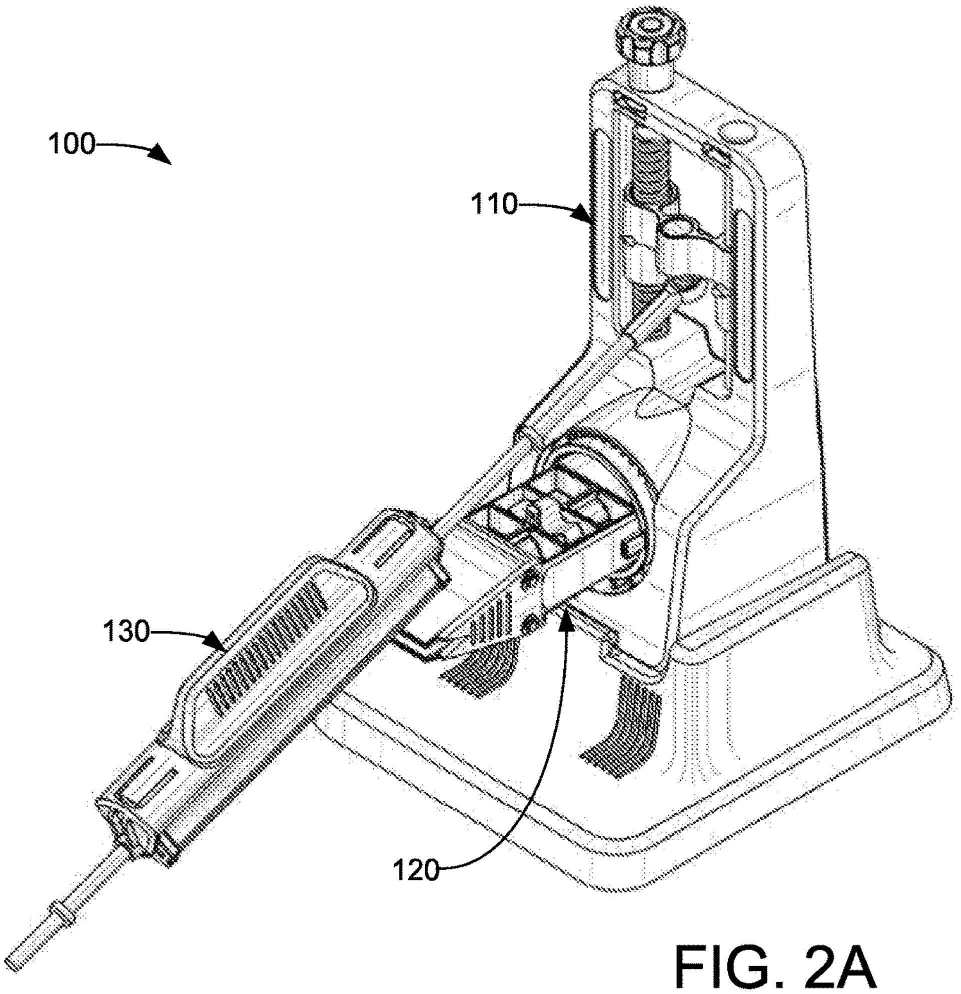
FIG. 2A

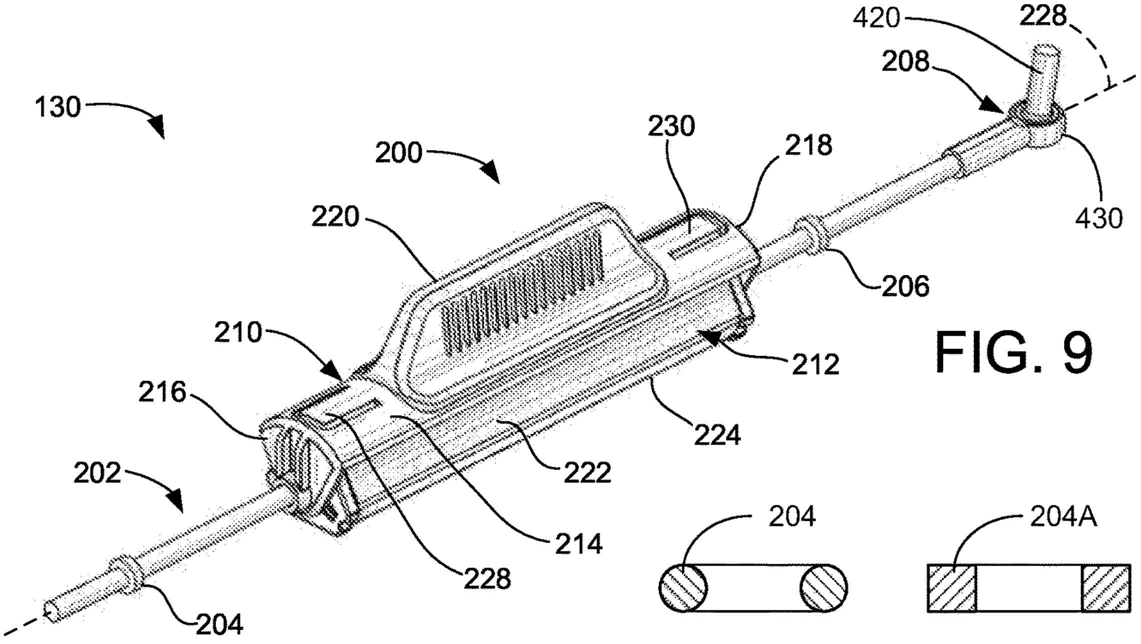
FIG. 9
FIG. 9A
FIG. 9B
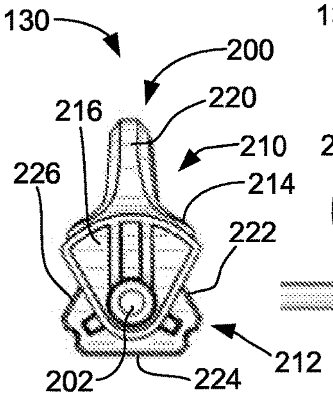
FIG. 10A
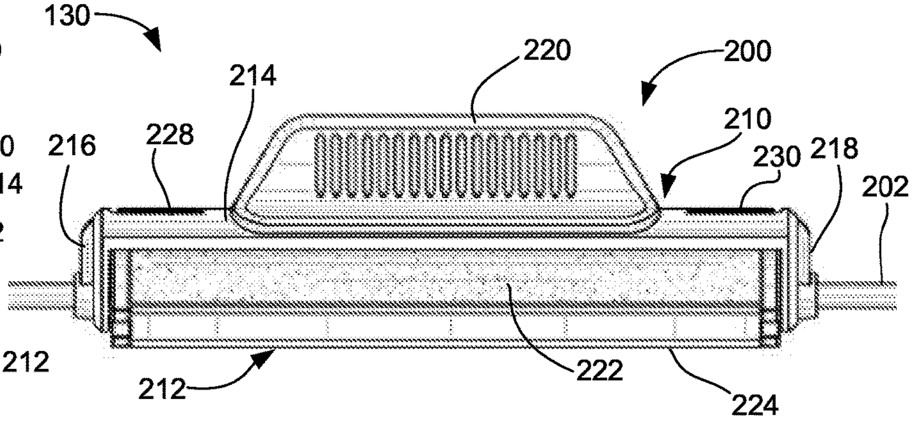
FIG. 10B
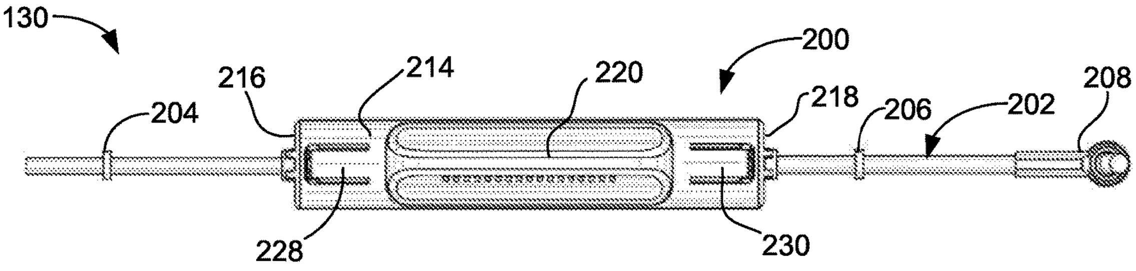
FIG. 10C

PRECISION ADJUST SHARPENER

CROSS-REFERENCE TO RELATED APPLICATIONS

This application is a continuation of U.S. patent application Ser. No. 17/967,488, filed Oct. 17, 2022, and titled Precision Adjust Sharpener, which is a continuation of U.S. patent application Ser. No. 17/473,380, filed Sep. 13, 2021, and titled Precision Adjust Sharpener, which claims priority to and the benefit of U.S. Provisional Application No. 63/198,004, filed Sep. 23, 2020, and titled Precision Adjust Sharpener, the entire content of each of which is incorporated herein by reference.

BACKGROUND

Cutting tools are used in a variety of applications to cut or otherwise remove material from a workpiece. A variety of cutting tools are well known in the art, including but not limited to knives, scissors, shears, blades, chisels, machetes, saws, drill bits, etc.

A cutting tool often has one or more laterally extending, straight or curvilinear cutting edges along which pressure is applied to make a cut. The cutting edge is often defined along the intersection of opposing surfaces (bevels) that intersect along a line that lies along the cutting edge.

In some cutting tools, such as many types of conventional kitchen knives, the opposing surfaces are generally symmetric; other cutting tools, such as many types of scissors and chisels, have a first opposing surface that extends in a substantially normal direction, and a second opposing surface that is skewed with respect to the first surface.

Complex blade geometries can be used, such as multiple sets of bevels at different respective angles that taper to the cutting edge. Scallops or other discontinuous features can also be provided along the cutting edge, such as in the case of serrated knives.

Cutting tools can become dull over time after extended use, and thus it can be desirable to subject a dulled cutting tool to a sharpening operation to restore the cutting edge to a greater level of sharpness. A variety of sharpening techniques are known in the art, including the use of grinding wheels, whet stones, abrasive cloths, abrasive belts, etc. Nevertheless, there remains a continual need for improved sharpener configurations that can provide accurate and repeatable sharpening operations.

BRIEF SUMMARY

Various embodiments are directed to an apparatus and method for sharpening a cutting edge of a cutting tool, such as a kitchen knife.

In some embodiments, a fixture is adapted to secure opposing sides of a blade of the cutting tool and includes a main body and first and second clamping jaws each having a clamping end adapted to compressingly engage a respective side of the blade and a distal end. The clamping jaws are hingedly affixed to the main body. A guide coupled to the main body has converging support surfaces to contactingly engage a spine of the blade opposite the cutting edge to center the blade along a central plane. A retraction mechanism establishes a clamping force between the first and second clamping jaws and the respective sides of the blade. The first and second clamping jaws and the guide provide spaced apart multi-point contacts to each side of the blade that are symmetric about a central plane of the blade.

In other embodiments, a sharpener includes a blade fixture configured to secure opposing sides of a blade of the cutting tool about a central plane of the blade. The blade fixture has a main body and first and second clamping jaws each having a clamping end adapted to contactingly engage a respective side of the blade and a distal end, each distal end hingedly affixed to the main body and each advanced with relation to a central plane of the main body, A base assembly has a receiving slot configured to receive a distal end of the main body of the blade fixture while the blade fixture secures the blade in a first orientation, A central plane of the receiving slot is nominally aligned with the central plane of the blade fixture and the central plane of the blade. An abrasive assembly has an abrasive member with an abrasive surface supported by a swing arm rod affixed to the base assembly at a selected sharpening angle, the abrasive assembly configured for movement, by a user, of the abrasive surface along the cutting edge of the cutting tool to impart a sharpening operation at the selected angle to the first side of the blade thereon while the blade fixture is inserted into the receiving slot of the base assembly. The blade fixture is configured to be removed and replaced into the receiving slot of the base assembly to place the blade in a different, second orientation. The central planes of the blade, fixture and receiving slot are nominally aligned such that the abrasive assembly is positioned to impart a second sharpening operation at the selected angle on the second side of the blade.

In further embodiments, a method for sharpening a cutting edge of a cutting tool includes steps of: securing a blade of the cutting tool in a blade fixture, the blade fixture comprising a main body and first and second clamping jaws each having a clamping end adapted to contactingly engage respective first and second sides of the blade, each of the first and second clamping jaws hingedly affixed to the main body and each advanced with relation to a central plane of the main body to align the central plane of the main body with a central plane of the blade; inserting a distal end of the main body of the blade fixture into a receiving slot of a base assembly to present the first side of the blade; using an abrasive assembly comprising an abrasive member having an abrasive surface supported by a swing arm rod affixed to the base assembly at a selected sharpening angle to sharpen the first side of the blade; rotating the fixture with respect to the base assembly to present the second side of the blade; and using the abrasive assembly at the selected sharpening angle to sharpen the second side of the blade.

These and other features and advantages of various embodiments can be understood from a review of the following detailed description in conjunction with the accompanying drawings.

BRIEF DESCRIPTION OF THE DRAWINGS

FIGS. 1A and 1B illustrate a cutting tool in the form of a kitchen knife in accordance with the related art that can be sharpened by various embodiments of the present disclosure.

FIGS. 2A, 2B and 2C show respective views of a manual cutting tool sharpener constructed and operated in accordance with various embodiments of the present disclosure. FIG. 2A is an isometric view of the sharpener, FIG. 2B is a side view, and FIG. 2C is a top plan view.

FIG. 9 shows an isometric depiction of a removable abrasive assembly of the sharpener of FIG. 1 in some embodiments.

FIGS. 9A and 9B show alternative constructions for a limit stop member from FIG. 9.

FIGS. 10A through 10C show alternative views of the abrasive assembly.

DETAILED DESCRIPTION

Figure 2B:
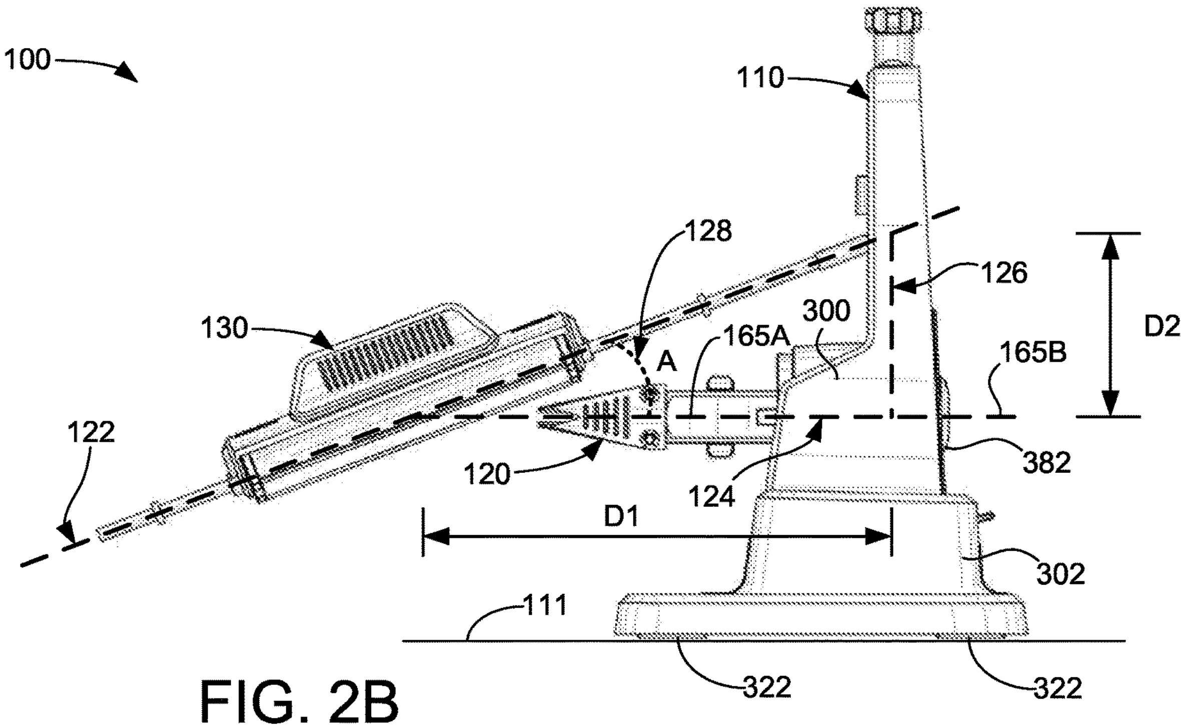

Various embodiments of the present disclosure are generally directed to a novel manual tool sharpener and a method of use thereof. The sharpener is adapted to sharpen any number of different types of cutting tools, including but not limited to kitchen knives, pocket knives, Bowie knives, pen knives, stilettos, scissors, daggers, dirks, swords, axes, etc. Other forms of cutting tools can be sharpened by the system as well.

Some embodiments provide the sharpener with base assembly configured to be supported on a horizontal support surface, such as a counter or workstation surface.

The base assembly supports a removable blade fixture. The blade fixture is configured to be inserted into a receiving slot of the base assembly at a precise, controlled orientation. The blade fixture has a pair of opposing clamping jaws configured to contactingly grasp (clamp) opposing sides of a blade of a cutting tool, such as but not limited to a kitchen knife.

The blade fixture has one or more mating features configured to engage the receiving slot in the base assembly so that, once a user installs the cutting tool into the blade fixture, the blade fixture can be mated to the base assembly at a fixed orientation. The blade fixture can be installed at two 180 degree angular positions so that both sides of the cutting tool can be respectively presented for sharpening at fixed and repeatable orientations. A depressible plunger can be activated to permit rotation of the blade fixture and the cutting tool within the base assembly between the respective angular positions. Alternately, the fixture and the cutting tool can be removed, rotated, and reinserted into the base assembly to achieve the desired angular position(s).

The blade fixture has a centering guide adjacent the clamping jaws. The guide may be arranged as one or more v-shaped notches, adapted to contactingly receive and center the spine (back side) of the blade being sharpened. This enables the blade fixture to engage the cutting tool at a fixed, repeatable and centered relation with respect to the base assembly each time the cutting tool is installed into the blade fixture. The guide aligns a central plane of the blade with a central plane of the blade fixture prior to installation into the base assembly. Once installed, the blade fixture aligns these planes with a central plane of the base assembly to ensure accurate and stable placement of the cutting edge in a desired position during the sharpening operation.

The guide contacts the blade at the spine while the upper and lower clamping jaws contact the respective blade sides at respective points between the cutting edge and the spine to form a spaced apart, multi-point contact arrangement. The guide and clamping jaws are positioned symmetrically about a central fixture plane of the fixture to secure the blade about a central blade plane of the blade. In this way, the blade is secured relative to the fixture in a repeatable and secure way. Offset tools, such as scissors, etc., can be similarly aligned.

The sharpener further comprises an abrasive assembly. The abrasive assembly is characterized as a swinging-type module connected at the end of a swing arm (rod) mounted to the base assembly. The abrasive assembly includes an abrasive block that is affixed to the rod. The user can move the abrasive block via a user handle along a controlled arcuate path to engage and sharpen a cutting edge of the cutting tool at a selected sharpening angle. The arcuate path can be thought of as a contoured planar path that generally follows the contour of the cutting edge as defined by the angle and distance of the swing arm with respect to the base assembly.

The abrasive assembly may include a cartridge that supports multiple abrasive members. It is contemplated that a total of three (3) abrasive members will be provided in the abrasive assembly, but other numbers of members can be used, including less or more than three. When multiple abrasive members are provided, each can be supplied with a different abrasiveness (grit) level. In one non-limiting embodiment, the abrasives are supplied with grits of 320, 600 and 1200. Other respective values can be used. Replaceable cartridges of abrasive members can be installed into the abrasive assembly as desired. Conformable media can be used.

The use of different abrasiveness levels allows different types of sharpening operations to be successively applied to the cutting tool. In one example, coarse sharpening operations can be initially applied as required, followed by fine and honing sharpening operations to dress and finalize the blade geometry. Different angles can be applied to each of the coarse, fine and honing sharpening operations. While ceramic or coated abrasive members are envisioned, substantially any form of abrasive material, including a leather strop, ceramic, diamond coated plates, sandpaper media, etc. can be supplied. Moreover, while the abrasive members are contemplated as being rectilinear and flat, other shapes can be used including curved, cylindrical, etc. In some cases, a layer of abrasive media may be supported by a compliant layer, such as a layer of open or closed cell foam, rubber, etc., to provide compliance to the sharpening operation.

The abrasive assembly can be provided with a spring feature that enables an interior rotatable cartridge, which supports the abrasive members, to be secured in different angular positions. A selected abrasive member from the cartridge can be rotated to be facing in a direction opposite the handle, thereby presenting the selected abrasive member against the cutting edge. Each successive abrasive member can be presented in turn by rotation of the cartridge.

At least some embodiments provide a number of core benefits to sharpening operations over the existing art. One benefit is the use of the guides of the blade fixture, which operate to contactingly align the backside of each blade so that a central plane of the blade nominally aligns with a central plane of the blade fixture. A related benefit to this is that the aligned planes of the tool and the fixture are in turn easily and repeatably aligned with a central plane of the base assembly, even if the fixture and blade are removed and reinserted into the base assembly, at the same or at a different rotational orientation.

Another benefit is the ability to remove the fixture while maintaining the existing settings of the base assembly and the abrasive assembly. This allows the cutting tool to be removed, inspected, cleaned or otherwise processed before being installed back into the sharpener without disturbing the previously established settings and by placing the tool at the exact same location it was in before. Yet another benefit is the ability to easily and quickly change to different abrasive media without changing or affecting any of the other system settings of the sharpener. Other features and benefits will readily occur to the skilled artisan in view of the following discussion.

FIGS. 1A and 1B provide schematic depictions of a cutting tool 10 of the related art. FIG. 1A is a side view and FIG. 1B is a partial end view. The tool 10 is characterized as a kitchen knife, although other forms of cutting tools can be sharpened by the various embodiments presented herein.

The knife 10 includes a user handle 12 with an outer grip surface adapted to be grasped by a user during use of the knife. A blade 14 extends from the handle 12. The blade has opposing flat, elongated sides 16, 18. These sides 16, 18 converge to a cutting edge 20. The cutting edge 20 is defined by the convergence of opposing tapered sides, or bevels 22, 24 at distal ends of the sides 16, 18. The bevels taper to an intersecting line which defines the cutting edge 20. A back edge, or spine 26 extends opposite the cutting edge 20 between the opposing sides 16, 18.

For purposes of the present discussion, the spine 26 represents that portion of the blade opposite the cutting edge 20 being sharpened during a sharpening operation. In some cases, the spine of the blade will represent the thickest portion of the knife and may comprise a flat, non-cutting surface. In other cases, the spine of the blade may constitute other features, including one or more cutting edges opposite the cutting edge, a series of serrations, multiple different surfaces that extend at different angles, etc. Examples of a blade with a cutting edge along the spine includes a double sided blade (e.g., a dirk), a Bowie knife, etc.

It will be understood that elements 16 and 18 define the overall sides of the blade, and the bevels 22, 24 form portions of the sides 16, 18 but are contoured to converge to the cutting edge 20. The bevels 22, 24 can be linear, hollow ground, convex, segmented, etc. as described below. Although not shown in FIGS. 1A-1B, similar bevels to the bevels 22, 24 can be provide adjacent cutting edges supplied along the spine 26 as desired and formed using techniques disclosed herein.

The blade 14 has an overall width dimension W, which extends between and bisects the cutting edge 20 and the spine 26. The blade 14 further has an overall length dimension L, which extends along the length of the blade 14 from the handle to the tip of the blade. The width dimension W varies along the length dimension L, which will usually be the case unless the tool has a parallel configuration for the cutting edge 20 and the spine 26 such as with a meat cleaver, etc.

The blade further has an overall thickness dimension T, which is the largest distance between opposing sides 16, 18. A central blade plane 165 bisects the thickness dimension T of the blade 14 along the width dimension W, as shown in FIG. 1B. This plane 165 further extends along the length dimension L of the blade 14, as shown in FIG. 1A. Ideally, the central blade plane 165 will intersect the cutting edge 20 and the spine 26. To the extent that it does not due to various factors such as manufacturing imperfections, etc., the various embodiments can be used to reshape the knife or other cutting tool to achieve this desired alignment.

Figure 2C:
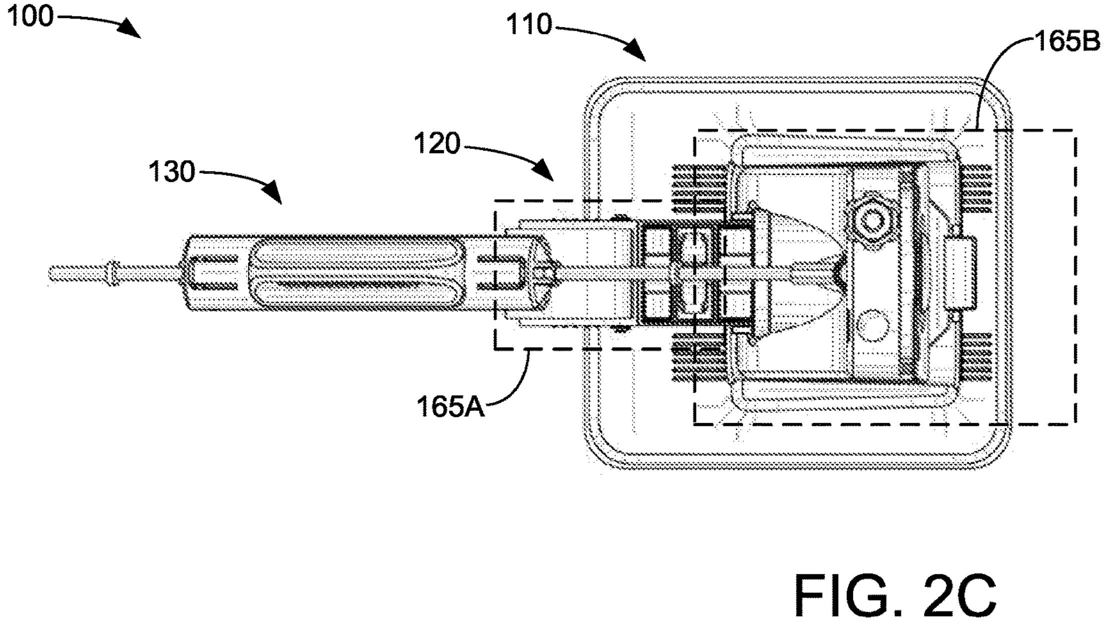

The knife 10 of FIGS. 1A and 1B, as well as other types and configurations of cutting tools, can be easily and precisely sharpened using a manual cutting tool sharpener 100, as depicted beginning in FIGS. 2A through 2C. FIG. 2A is an isometric view of the sharpener 100. FIG. 2B is a side elevational view of the sharpener 100. FIG. 2C is a top plan view of the sharpener 100.

The sharpener 100 includes a base assembly 110, which is configured to be supported on an underlying support surface, such as a work bench, as represented by surface 111 in FIG. 2B.

A removable blade fixture 120 is attachable to the base assembly 110 as shown to secure a cutting tool such as 10 in FIGS. 1A-1B. As explained below, the blade fixture 120 includes opposing jaw members which grasp opposing sides of the blade to be sharpened, such as side surfaces 16, 18 in FIG. 1B. This presents the cutting edge 20 (FIGS. 1A and 1B) in an outwardly directed orientation to enable sharpening by a removable abrasive assembly 130.

The abrasive assembly 130 is characterized as a swing arm type of sharpening assembly that is configured to be advanced along the cutting edge of the tool by the user once the tool is secured by the blade fixture 120 and mated into the base assembly 110. The abrasive assembly 130 includes multiple abrasive surfaces that can be successively selected by the user for presentation against the cutting edge (e.g., 20 in FIGS. 1A and 1B) to carry out various sharpening operations. Those skilled in the art will appreciate that during such sharpening, the abrasive assembly 130 will form/shape local surfaces such as the beveled surfaces 22, 24 in FIG. 1B in order to sharpen the cutting edge 20.

FIG. 2B shows certain geometries of interest. A triangular configuration is established by a rod axis 122 that aligns along a presentation of the abrasive assembly 130, a horizontally extending axis 124 that bisects the blade fixture 120, and a vertically extending axis 126 that extends between the axes 122, 124. An intervening angle 128, denoted as angle A, extends between axes 122, 124. For reference, angle A represents an effective sharpening angle that is applied to the side of the blade being sharpened.

The sharpening angle A can be adjusted by raising or lowering a distal end of the abrasive assembly 130 relative to the base assembly 110. Other factors can affect this angle A as well, such as the distance along horizontal axis 124 at which the distal end (cutting edge) of the blade is disposed.

Various planes are nominally aligned along axis 124 based on the interaction of the blade fixture 120 with the base assembly 110. More specifically, the aforementioned central blade plane 165 (see FIGS. 1A-1B) is nominally aligned with a central fixture plane 165A of the blade fixture 120, as well as with a central base assembly plane 165B established by the base assembly 110. In this way, planes 165, 165A and 165B are all nominally parallel and aligned with the common axis 124 during operation. FIG. 2C shows top plan representations of the respective planes 165A and 165B, which are nominally coplanar.

For reference, distance D1 in FIG. 2B depicts the overall effective horizontal distance, or length, of axis 124 from a connection point of the base assembly 110 at which the abrasive assembly 130 is attached thereto, to the cutting edge of the blade which projects from the fixture 120. Distance D2 depicts the overall effective height of axis 126, which represents the vertical distance from the connection point of the base assembly to axis 124 (which nominally intersects the cutting edge of the blade).

Figure 3:
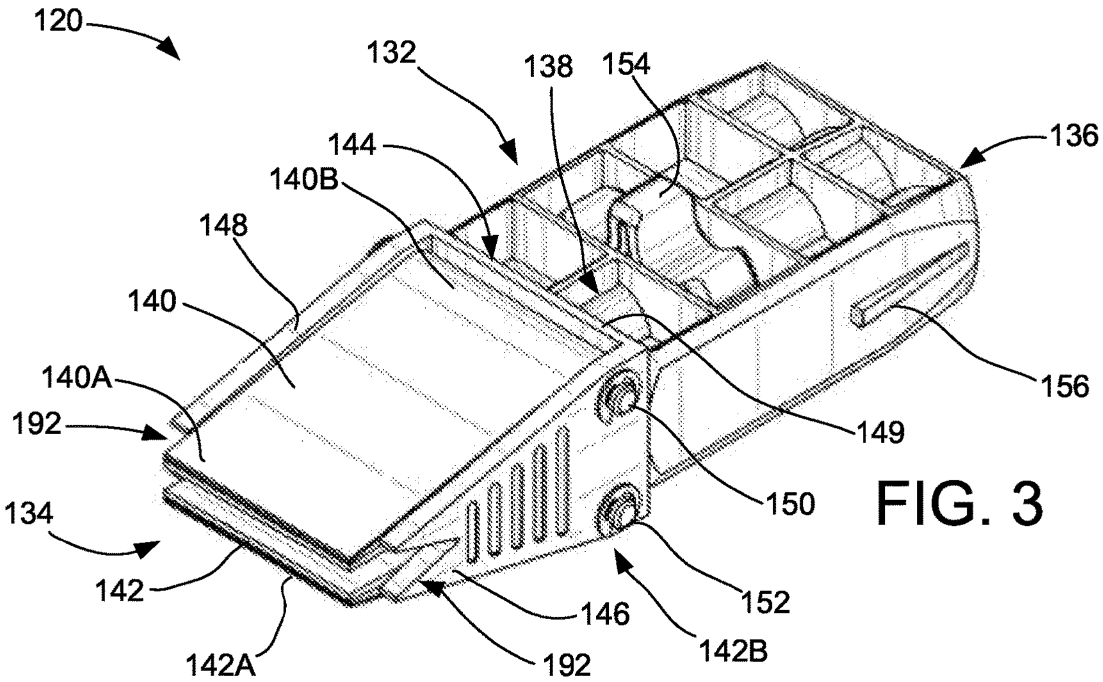
FIG. 3 is an isometric depiction of a removable blade fixture of the sharpener of FIG. 1 in in accordance with some embodiments.
Figure 4A:
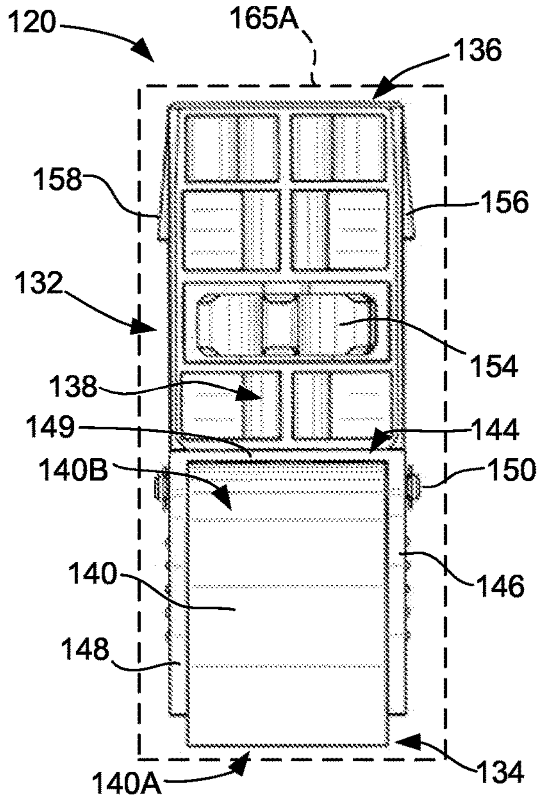
FIGS. 4A and 4B are top and side plan views of the blade fixture of FIG. 3.
Figure 4B:
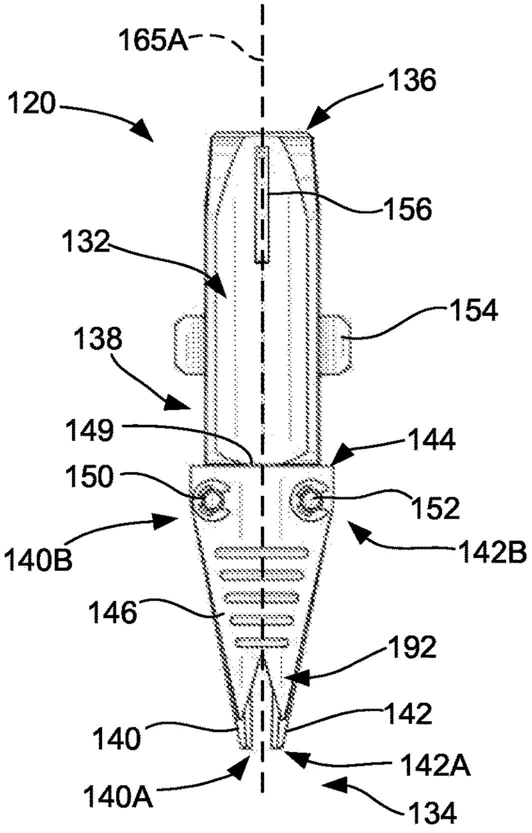

FIG. 3 is an isometric depiction of the blade fixture 120 of FIGS. 2A-2C in some embodiments. FIGS. 4A and 4B show top and side plan views of the blade fixture 120 from FIG. 3.

The blade fixture 120 includes a main body 132 with opposing proximal end 134 and distal end 136. Housed within the main body 132 is a retraction mechanism 138, details of which will be described more fully below.

A pair of opposing clamping jaws 140, 142 are disposed at the proximal end 134 of the blade fixture. The clamping jaws 140, 142 are sometimes referred to as a first clamping jaw and a second clamping jaw, as well as an upper jaw and a lower jaw. The jaws 140, 142 are arranged to compressingly engage opposing sides of the blade of the cutting tool (e.g., sides 16, 18 in FIG. 1B) during a sharpening operation. The jaws 140, 142 are hingedly mounted to a support assembly 144 affixed to the main body 132.

The support assembly 144 is substantially u-shaped and includes opposing first and second support plates 146, 148 which project from a transversely extending base plate 149. The support plates 146, 148 are stationary in nature and are arranged to extend along and in adjacent relation to respective sides of the jaws 140, 142 as shown.

Each of the jaws 140, 142 have a proximal end (or clamping end) 140A, 142A and a distal end (or a hinged end) 140B, 142B. The respective clamping ends 140A, 142A are configured to compressingly engage the sides of the blade to be sharpened. The respective distal ends 140B, 142B are configured to rotate relative to the support plates 146, 148 via shafts 150, 152. The shafts 150, 152 extend through the distal ends 140B, 142B of the jaws 140, 142 and into the respective stationary first and second support plates 146, 148. This arrangement allows the distal ends 140B, 142B to rotate about the shafts 150, 152. Other hinged arrangements can be used as desired so this hinged arrangement of FIG. 4A is illustrative and is not limiting.

The retraction mechanism 138 includes a knob 154, which is user activated to selectively increase and decrease the amount of compressive clamping force exerted by the clamping ends 140A, 142A of the clamping jaws 140, 142. Side rails 156, 158 (best viewed in FIG. 4A) aid in the alignment and securement of the blade fixture 120 into the base assembly 110. The central fixture plane 165A is respectively shown in FIGS. 4A and 4B.

Figure 5:
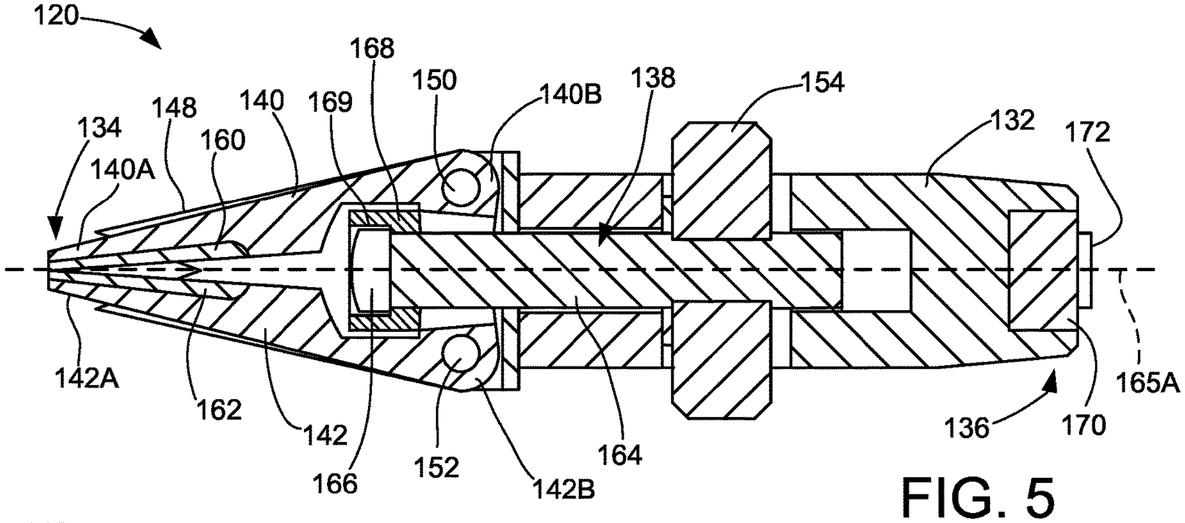
FIG. 5 is a cross-sectional representation of the blade fixture.

FIG. 5 provides a cross-sectional depiction of the blade fixture 120 to show further details of interest. Each of the jaws 140, 142 optionally includes a recessed layer of non-marring, elastomeric material; a first such layer 160 is incorporated into the upper jaw 140 and a second such layer 162 is incorporated into the lower jaw 142. The layers 160, 162 can be any suitable material, such as but not limited to neoprene. The material that forms the layers 160, 162 is sufficiently rigid to secure the blade while at the same time compliant enough to not scratch, mar or otherwise deform the finish of the blade. While compliant materials are shown, such are not necessarily required; other embodiments do not utilize such materials and instead use the jaws, or other features thereof, to directly engage and clamp the cutting tool.

The retraction mechanism 138 from FIGS. 3, 4A and 4B is shown in FIG. 5 to include a threaded shaft 164 embedded within the main body 132 of the blade fixture 120. The knob 154 is adapted to engage the threads of the shaft 164 in order to advance and retract the shaft 164 along a central axis that nominally lies along the aforedescribed central fixture plane 165A.

A retention member 166 is affixed to a proximal end of the shaft 164 adjacent and between the jaws 140, 142. The retention member 166 is substantially rectangular in shape, and may have a curved facing surface as shown. The retention member 166 is fixed to the proximal end of the shaft 164.

The retention member 166 is configured to be retracted into a pressure block 168. A recessed slot 169 is formed in the pressure block 168 for this purpose; that is, the recessed slot 169 is sized to receive and nest the retraction member 166. As the shaft 164 is retracted through user rotation of the knob 154, the member 166 retracts (via insertion into the slot 169) the block 168, thereby causing the jaws 140, 142 to rotate about the respective shafts 150, 152 and increase clamping force therebetween. Other retraction mechanisms can be used.

Further features of the blade fixture 120 in FIG. 5 include a reinforced base insert 170 and a magnet 172 affixed to the distal end 136 of the main body 132.

Figure 6A:
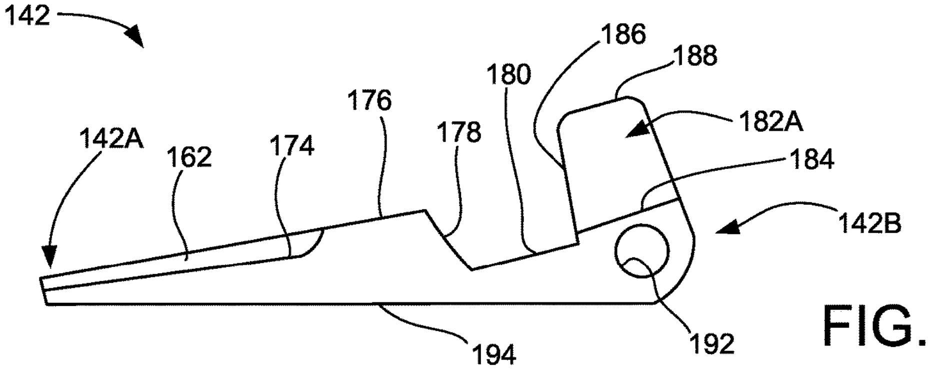
FIGS. 6A and 6B show side and top plan views of a clamping jaw of the blade fixture.
Figure 6B:
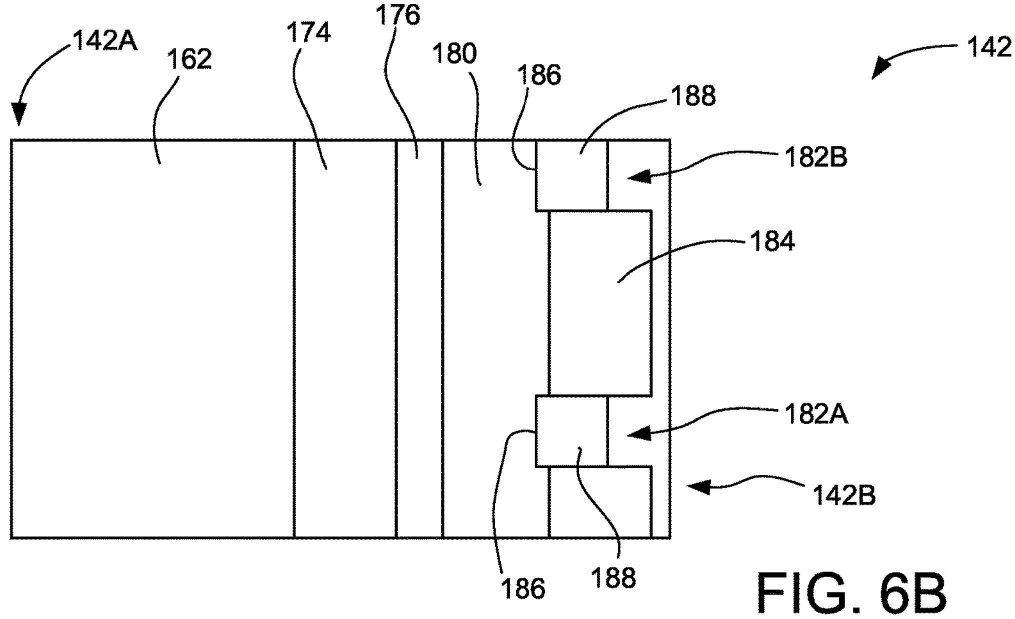

FIG. 6A shows a side elevational view of the lower jaw 142 in accordance with some embodiments. FIG. 6B is a corresponding top plan view of the lower jaw 142 of FIG. 6A. It will be understood that the features depicted on the lower jaw 142 are also present on the upper jaw 140, although the upper jaw 140 is rotated 180 degrees with respect to the lower jaw 142 so as to be in facing relation thereto. In this way, the respective jaws 140, 142 are nominally identical and arranged in mirrored fashion to enhance manufacturability. This is not necessarily required, however, as the respective jaws can have different configurations.

Continuing with FIG. 6A, the compliant layer 162 (e.g., layer of neoprene, etc.) is housed within a recess 174 of an interior clamping surface 176. A recessed surface 178 extends downwardly from the surface 176, to provide clearance for the operation of the retraction member 166 and pressure block 168 (FIG. 5). A shoulder surface 184 extends from the recessed surface 180 to further provide the above noted clearance.

A pair of spaced apart projections 182A, 182B extend upwardly at a desired angle from a platform portion 184 adjoining the shoulder surface 180. Each of the respective projections 182A, 182B has a pressure surface 186 and a top surface 188.

Figure 7A:
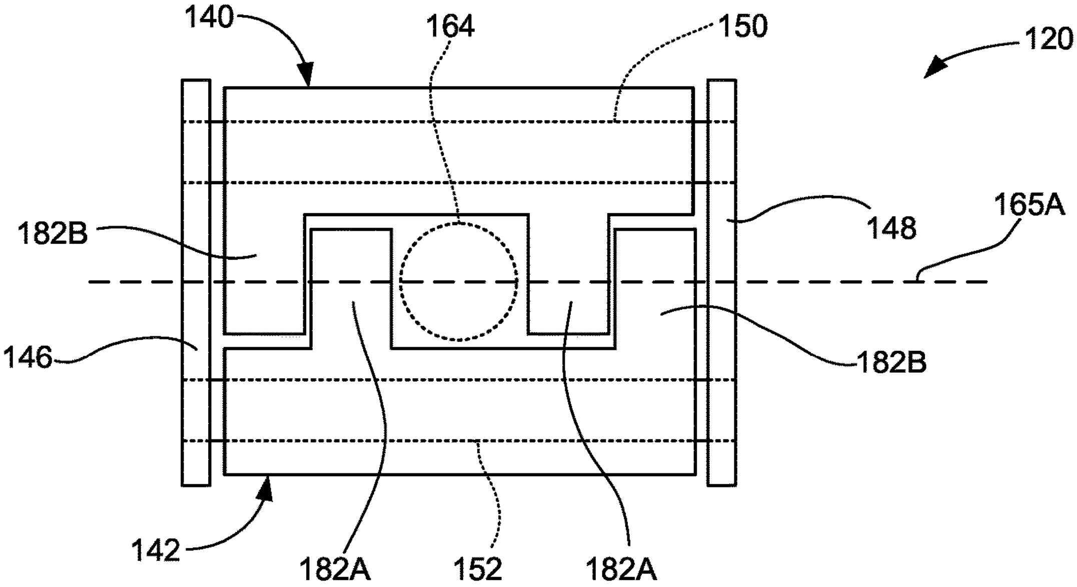
FIGS. 7A and 7B show interaction of the respective top and bottom clamping jaws of the blade fixture in some embodiments.
Figure 7B:
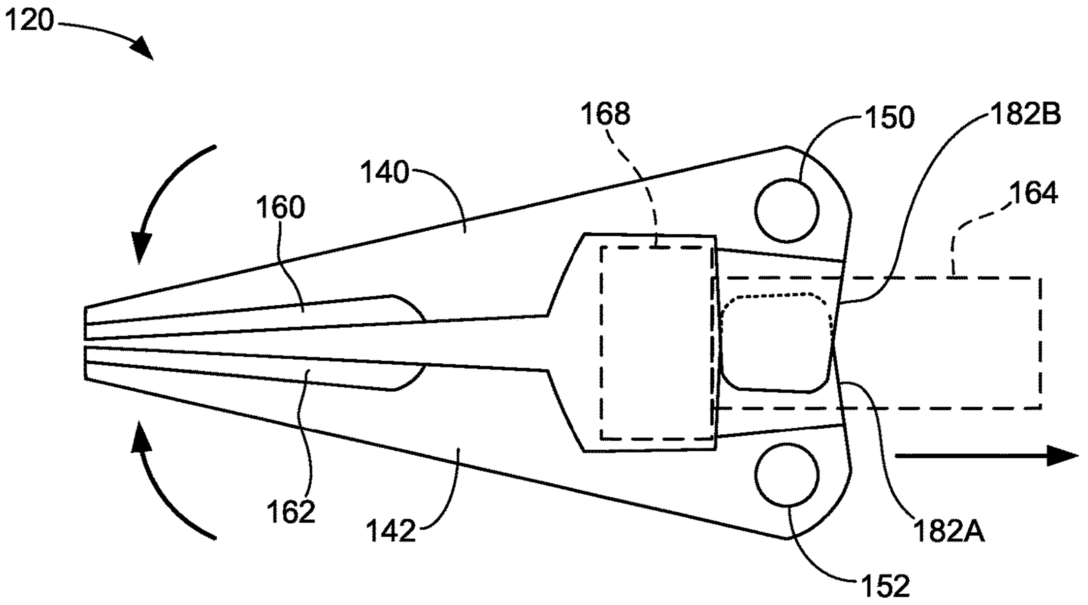

FIGS. 7A and 7B show the interlocking orientation of the projections 182A, 182B on both the upper jaw 140 and the lower jaw 142. A pair of the projections is arranged on each side of the central shaft 164. The pressure block 168 (see FIG. 5) bears against the pressure surfaces 186 of the respective projections as the shaft 164 is retracted to induce rotation of the jaws 140, 142 about the respective shafts 150, 152, thereby applying a desired clamping force upon the opposing sides of the blade (FIG. 1B).

Figure 8A:
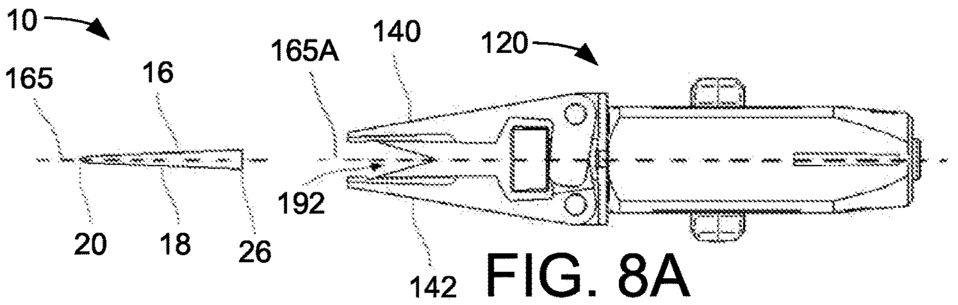
FIGS. 8A through 8C show additional details regarding the blade fixture in some embodiments.
Figure 8B:
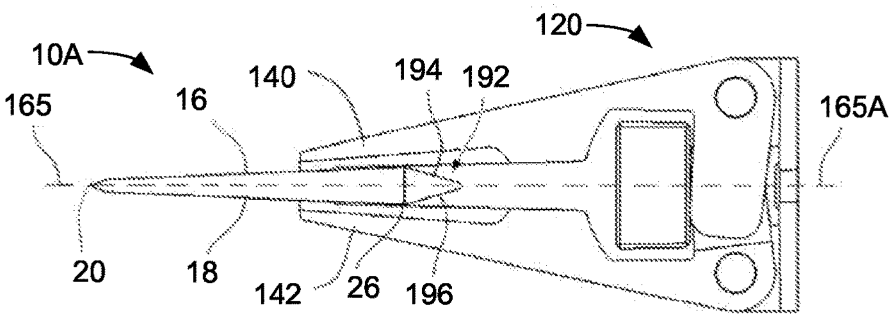
Figure 8C:
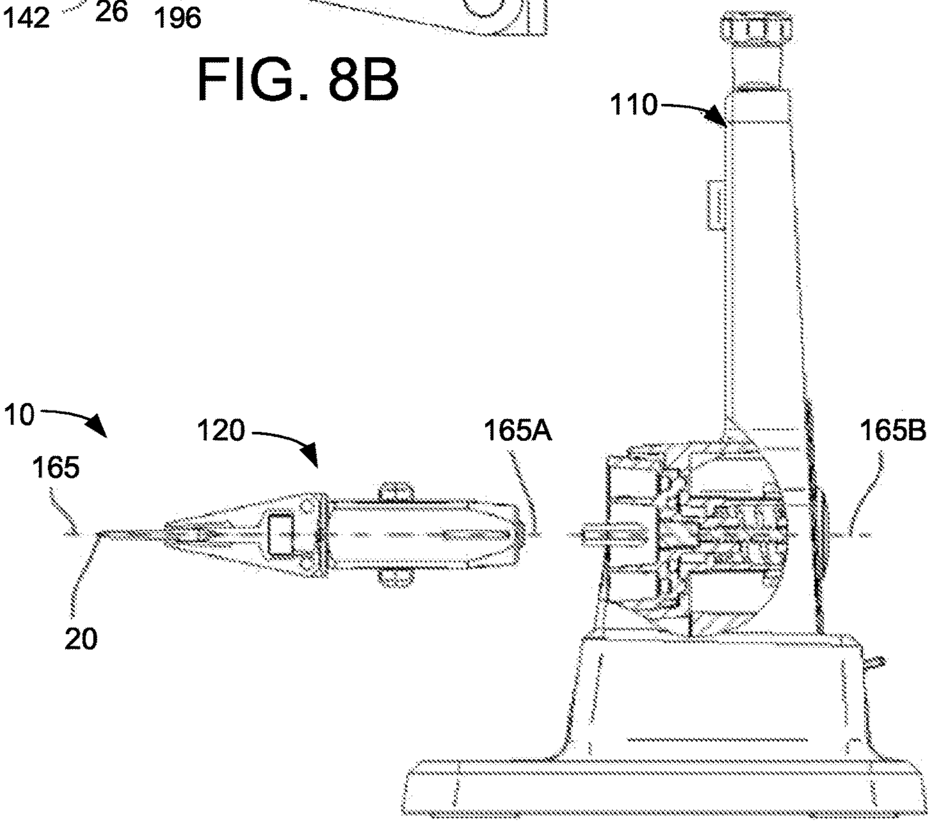

FIGS. 8A through 8C show further details regarding the blade fixture 120. FIG. 8A shows the presentation of the cutting tool 10 from FIGS. 1A-1B into alignment guides 192 of the blade fixture 120. FIG. 8B is an expanded view of FIG. 8A and shows mating arrangement of the cutting tool 10 such that the spine 26 of the cutting tool 10 is brought into contact with guides 192. The centering and limit stop characteristics of the guides 192, defined by surfaces 194, 196, provide nominal centering and insertion depth limit operations upon the spine 26, thereby centering the blade 10 within the blade fixture 120 and aligning the central blade plane 165 with the central fixture plane 165A.

As further shown in FIG. 8C, insertion features further align planes 165, 165A and 165B in a controlled and repeatable fashion, even if the blade fixture 120 and blade 10 are removed and replaced into the base assembly 110. The guides 192 are characterized as v-shaped notches and are provided on each side of the clamping jaws 140, 142 at a medial location between the proximal and distal ends 140A/140B and 142A/142B thereof, as provided by the respective side plates 146, 148.

The various components forming the blade fixture 120 can be constructed of any number of suitable materials. Without limitation, in some embodiments the clamping jaws 140, 142 are formed of metal (such as steel), the main body 132 is formed of injection molded plastic, and the support assembly 144 (including opposing support plates 146, 148) is formed of metal or plastic. Other configurations can be used, however, including an arrangement wherein the support assembly is integrated into the main body 132 as a single piece construction, all pieces are formed of metal, all pieces are formed of plastic, some or all pieces are formed of different materials, etc. As noted above, removable and/or adjustable side plates can be provided to accommodate different lengths, thicknesses and widths of cutting tools within the same blade fixture. A shorter or longer blade fixture can be used; other clamping and securement mechanisms can be used; and so on.

Reference is now made to FIG. 9, which provides an isometric depiction of the abrasive assembly 130 of FIGS. 2A-2C. The abrasive assembly 130 generally comprises an abrasive block 200 (also sometimes referred to as a sharpening block or an abrasive block assembly). The abrasive block 200 is affixed for sliding movement along a moveable rod 202.

Limit stops, such as in the form of elastomeric rings 204, 206, can be placed in suitable locations along the rod 202 to define a desired range of axial motion of the abrasive block 200 along the rod 202. The rings 204, 206 provide a compression fit against the outer surface of the rod 202 and can be slidingly moved as desired by the user for a given sharpening application.

Different configurations can be used for the rings 204, 206 as desired. FIG. 9A shows a first ring 204 with a circular cross-sectional shape. FIG. 9B shows a second ring 204A with a rectilinear (e.g., square) cross-sectional shape. Other configurations can be used as desired, including rings with inner or outer rectilinear shapes, etc.

An engagement mechanism 208 is disposed at a distal end of the rod 202 as shown. The engagement mechanism 208 has ball and socket configuration to facilitate mating engagement of the rod 202 with the base assembly 110.

FIGS. 10A through 10C show additional views of the abrasive assembly 130. The abrasive block 200 includes a generally u-shaped housing 210 and a rotatable abrasive cartridge 212 supported within the housing 210. The housing 210 has a longitudinally extending base assembly portion 214 that extends along the extent of the abrasive block 200 and has respective proximal and distal ends 216, 218, each characterized as downwardly depending flanges configured to intersect and allow passage of the rod 202 therethrough.

A centrally disposed handle 220 extends upwardly from the longitudinally extending base assembly portion 214 of the housing 210. The handle 220 provides a user graspable surface to enable the user to safely manipulate the abrasive block 200 during a sharpening operation as the user advances the abrasive block along the exposed cutting edge of the tool.

In the embodiment of FIGS. 9 and 10A-10C, the rotatable abrasive cartridge 212 includes a total of three (3) abrasive members 222, 224 and 226. These members are arranged in a substantially triangular orientation, so that each member has an associated abrasive surface that extends at an angle of nominally 60 degrees with respect to each of the other remaining abrasive surfaces, as measured along a rod axis

228 along the rod 202 (see FIG. 9). The rod axis 228 corresponds to rod axis 122 in FIG. 2B, for reference.

It is contemplated that each of the abrasive members 222, 224, and 226 will have different abrasiveness levels, or grits, to enhance the sharpening operation. Without limitation, in one embodiment the first abrasive member 222 is a diamond coated metal member with an abrasiveness level of 320 grit, the second abrasive member 224 is a diamond coated metal member with an abrasiveness level of 600 grit, and the third abrasive member 226 is a ceramic member with an abrasive level of 1200 grit. Other material compositions and grit levels can be used as desired, so these are merely for purposes of illustration and are not limiting.

As described more fully below, a sequential sharpening operation can be carried out in which the first, most aggressive abrasive surface is used for a coarse sharpening operation; the second, less aggressive abrasive surface is used for a fine sharpening operation; and the third, least aggressive abrasive surface is used for a honing operation. Not all three surfaces need be used during every sharpening operation.

Figure 11A:
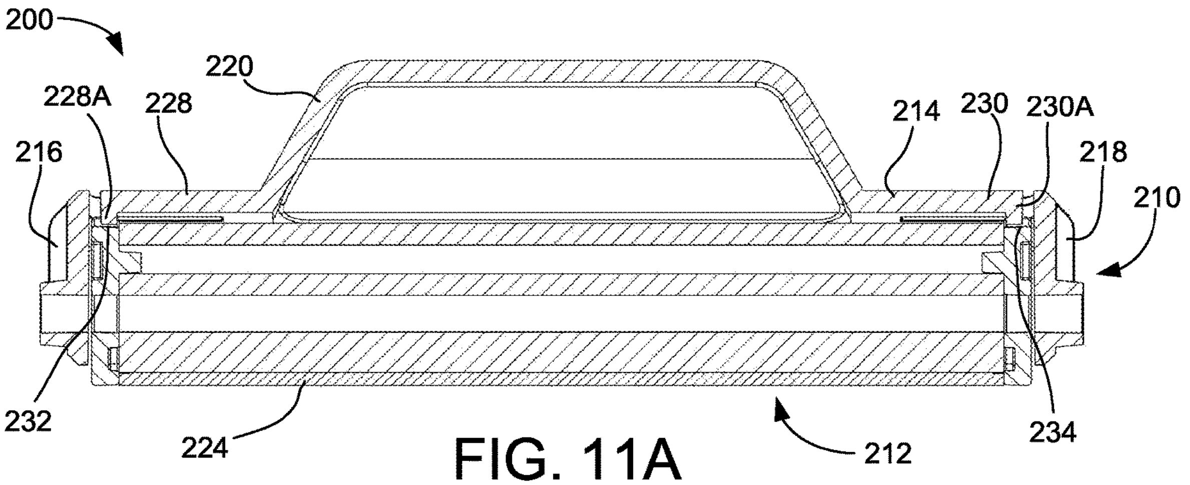
FIGS. 11A through 11C show further details of the abrasive assembly.
Figure 11B:
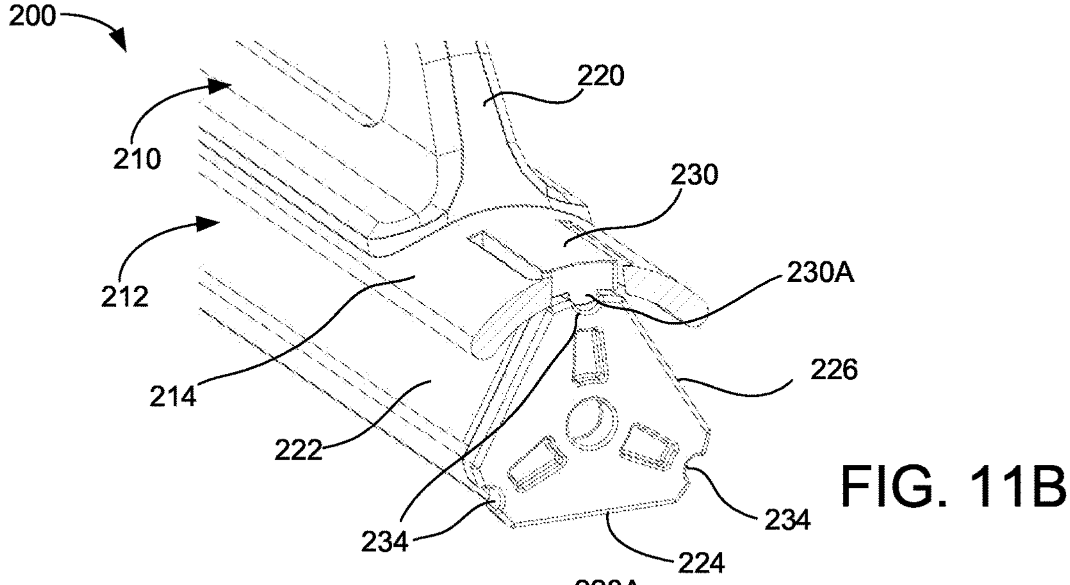
Figure 11C:
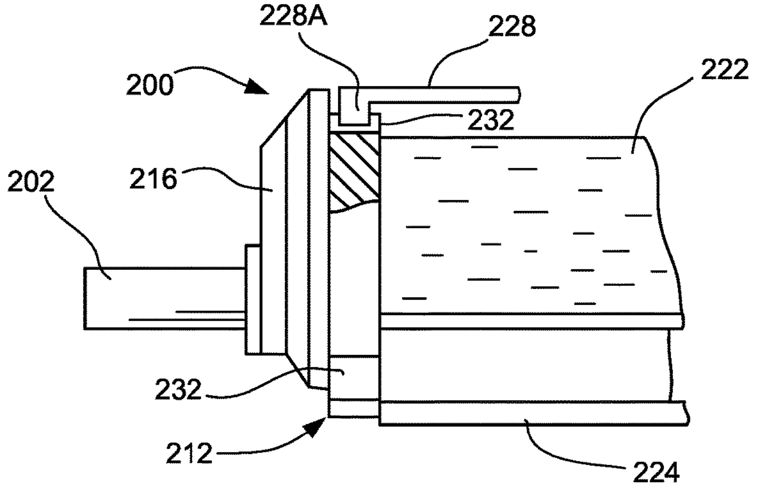

FIGS. 11A through 11C show further details regarding the abrasive block 200 in some embodiments. FIG. 11A is a cross-sectional representation of the abrasive block 200. FIG. 11B is a partial cross-sectional end isometric view to illustrate the locking interaction between the housing 210 and the cartridge 212. FIG. 11C is a schematic diagram to further illustrate this interaction between the housing 210 and the cartridge 212.

As noted above, a particular feature of the block 200 is the ability to present different abrasive surfaces for sharpening against the blade secured by the blade fixture 120. To this end, a pair of retention assemblies are provisioned at each end of the base assembly 214 of the housing 210. Each retention assembly comprises a spring biased arm 228, 230 that recesses into a corresponding slot (groove) 232, 234 of the cartridge 212. This allows the user to rotate the cartridge 212 within the housing 210 to present the desired abrasive surface of the respective abrasive members 222, 224, 226. The arms 228, 230 allow rotation of the cartridge, and serve to lock into place the desired facing abrasive surface through engagement of the respective arms 228, 230 into the grooves 232, 234.

Each spring biased arm 228, 230 has a locking flange (deflectable finger) 228A, 230A that nests into the corresponding groove 232, 234. The spring bias force provided is sufficient to lock the cartridge 212 in a desired configuration so that the selected abrasive surface is facing away from the handle 220 and allows the abrasive to remain fixed relative to the axis 228 during the sharpening operation. At the same time, the spring bias force is compliant enough to allow the user to overcome this force and rotate the cartridge 212 within the housing 210 to select the next desired abrasive surface.

Figure 12A:
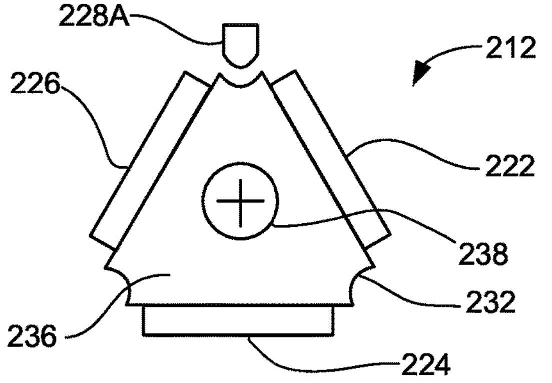
FIGS. 12A through 12D show different numbers and types of selectable abrasive surfaces that can be presented by the abrasive assembly in alternative embodiments.

FIG. 12A is a simplified schematic end depiction of the cartridge 212 from FIGS. 9 through 11C. As noted previously, a total of three (3) abrasive members are provided (members 222, 224 and 226). Grooves 232 are supplied in the corners of the substantially triangular arrangement to receive the respective locking features 228A (and 230A, discussed above). A main body for the cartridge is denoted at 236, and a central aperture 238 is provided through the main body 236 to accommodate the rod 202. The abrasive members can take any number of forms, including conformable members.

Figure 12B:
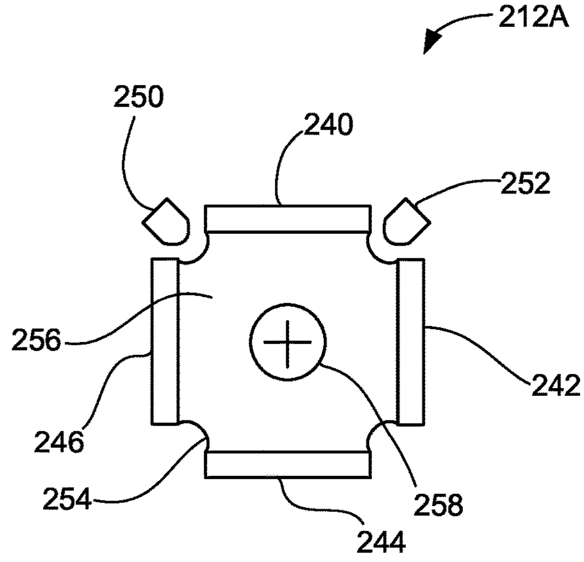

Other respective numbers of abrasive members can be incorporated into the abrasive block 200 as desired. FIG. 12B shows an alternative cartridge 212A, which has a total of four (4) abrasive members 240, 242, 244 and 246. In this case, one or more locking tabs (fingers), such as indicated at 250, 252, can be provided to recess into corresponding grooves 254. As before, the four abrasive members can be individually selected by the user as desired to impart different sharpening operations upon an associated cutting tool. It will be appreciated that the selected abrasive member will be rotated to the selected facing orientation. The cartridge 212A has a main body 256 with central aperture 258 to accommodate the rod 202.

Figure 12C:
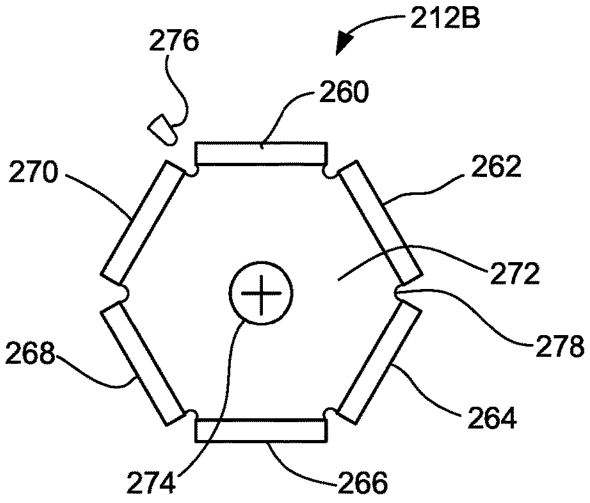

FIG. 12C shows another cartridge assembly 212B with a total of six (6) abrasive members 260, 262, 264, 266, 268, 270, supported by a main body 272 with central aperture 274. One or more locking tabs 276 are provisioned to lock the selected abrasive member into respective grooves 278 for presentation in the desired facing orientation against the cutting edge of the tool being sharpened.

Figure 12D:
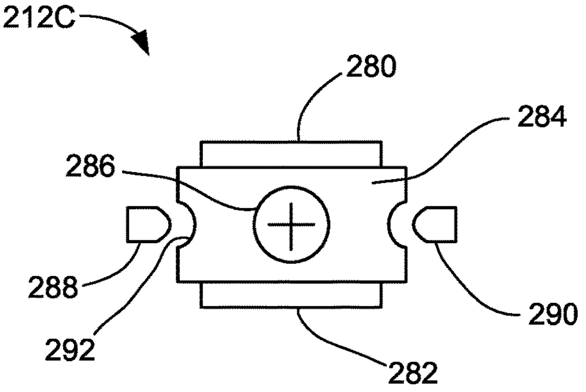

FIG. 12D shows yet another cartridge assembly 212C with a total of two (2) abrasive members 280, 282, mounted to main body 284 with aperture 286. Locking tabs (fingers) 288, 290 engage various grooves 292 as described above.

The various abrasive members may have different constructions (e.g., ceramic, diamond coated, replaceable media, lapping film, abrasive rods, leather, etc.) that provide different material removal rates and grits. However, it is contemplated that the same or similar abrasiveness levels may be provided on multiple sets of the abrasive members to enhance wear and other efficiencies. In some cases, an abrasive surface may be supported by a compliant layer, such as a layer of open or closed cell foam, rubber, etc., to provide compliance to the sharpening operation.

Figure 13:
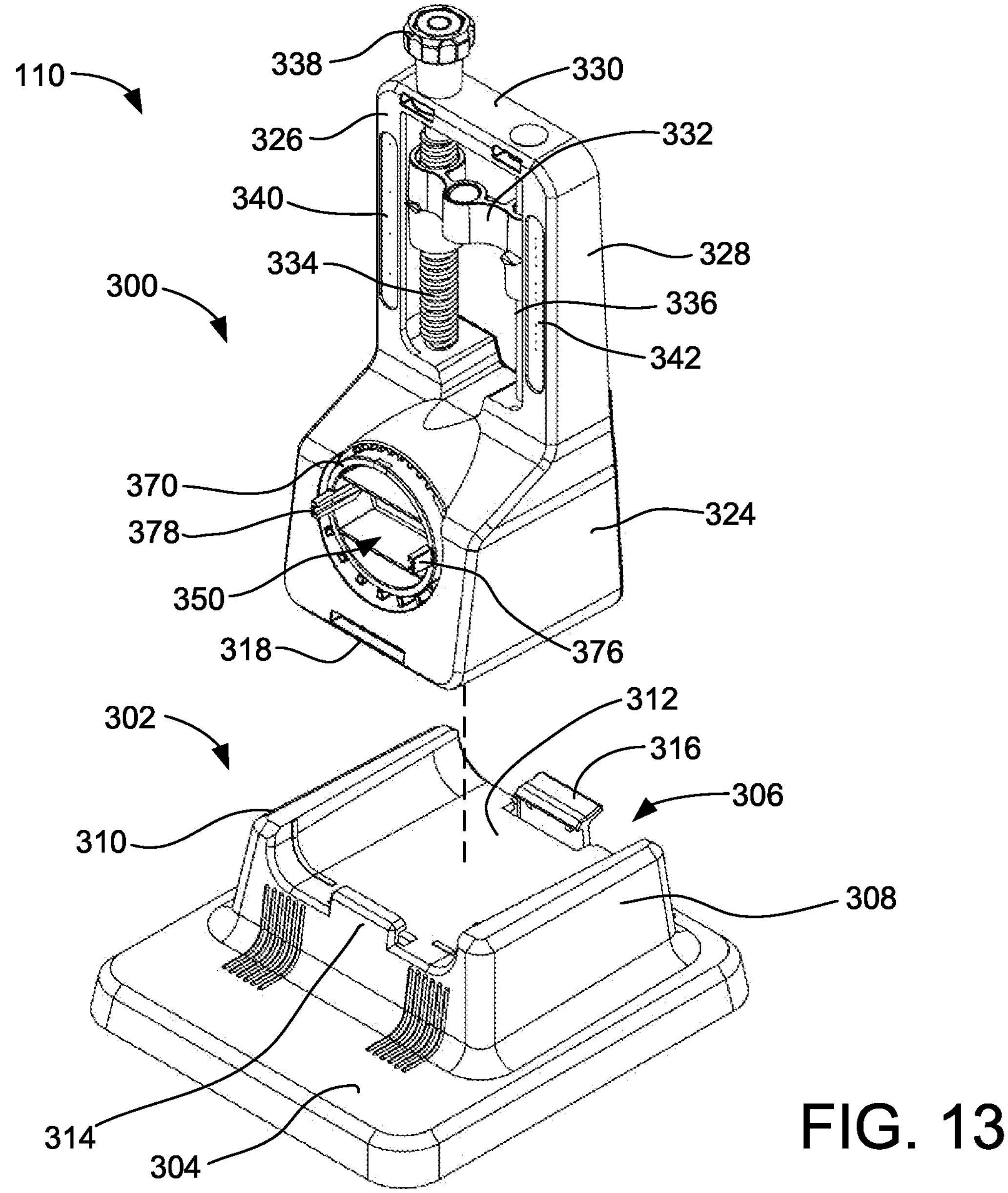
FIG. 13 is an exploded, isometric depiction of a base assembly of the sharpener of FIG. 1 in accordance with some embodiments.
Figure 14A:
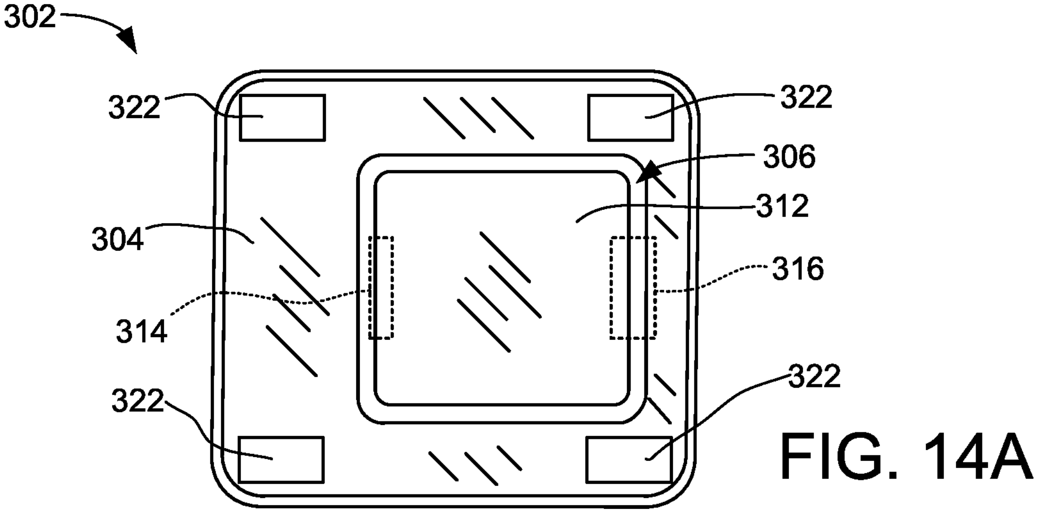
FIG. 14A is a bottom view of the base assembly.
Figure 14B:
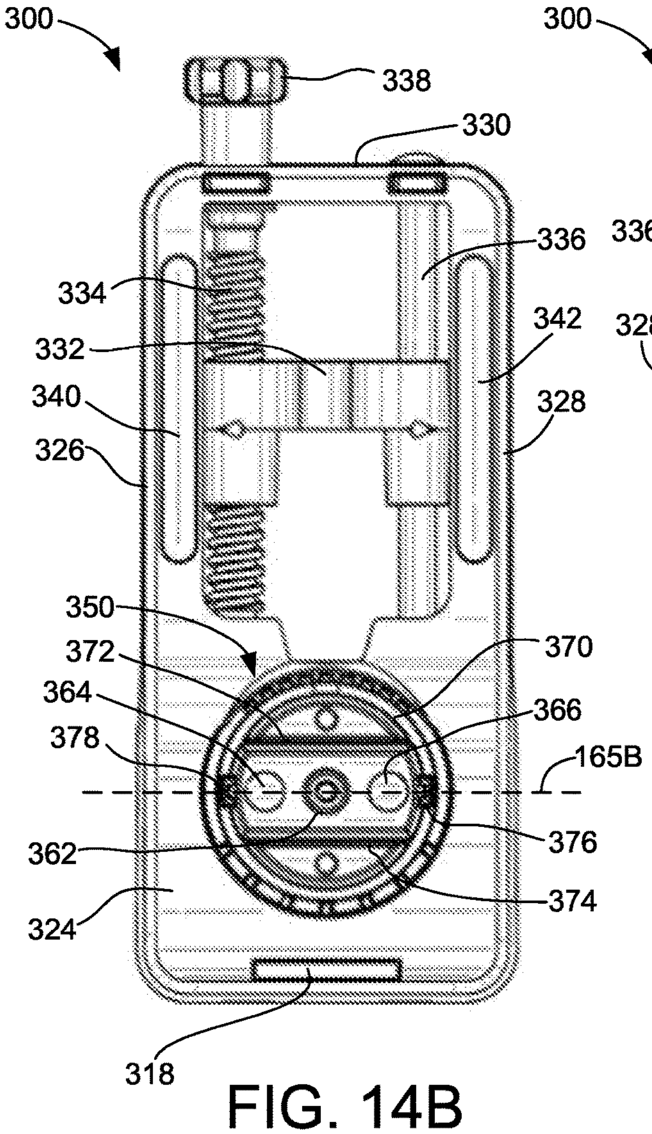
FIGS. 14B and 14C show respective front and rear end views of the base assembly.
Figure 14C:
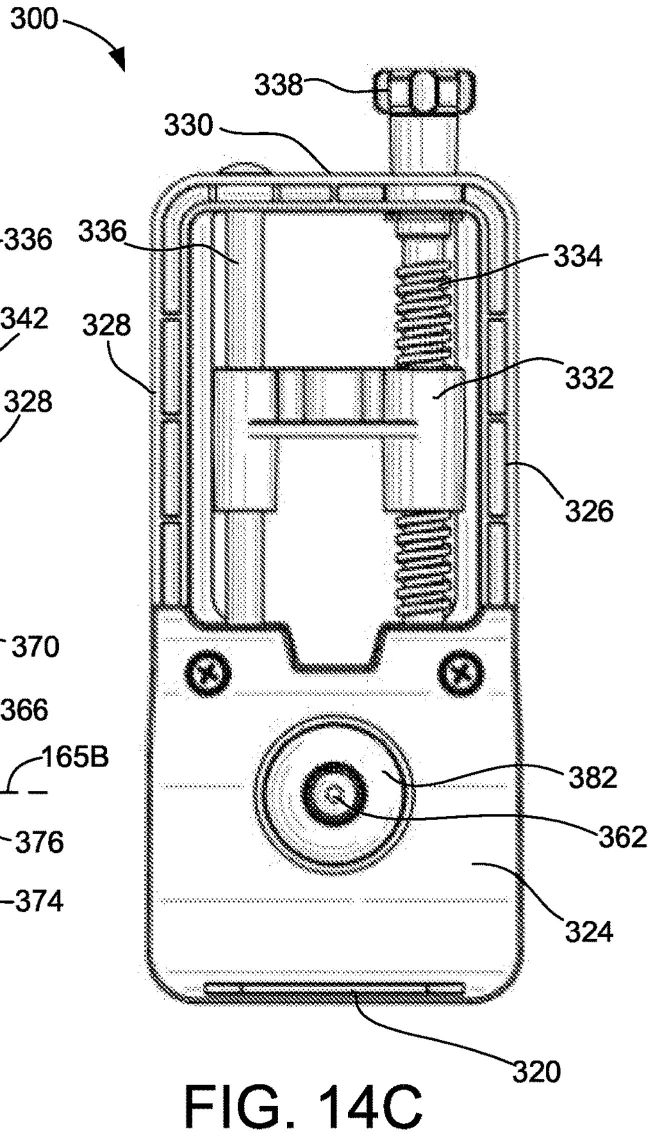

FIG. 13 shows an exploded, isometric depiction of the base assembly 110 from FIGS. 2A-2C. The base assembly 110 includes a tower assembly 300 which is configured to be matingly engageable with a base pedestal 302. Other configurations can be used, so the arrangement of the base assembly 110 in FIG. 13 is merely illustrative and is not limiting, including but not limited to a unitary base assembly construction. FIG. 14A shows a bottom plan view of the pedestal 302. FIGS. 14B and 14C show front and rear illustrations of the tower assembly 300.

The base pedestal 302 includes a rectilinear base 304 with a relatively large surface area to provide stability and support for the sharpener 100 on a base surface (e.g., surface 111 in FIG. 2B). A raised platform 306 extends from the base 304 having side walls 308, 310, base support surface 312, and deflectable front and rear locking tabs 314, 316. The tower assembly 300 includes front and rear receiving apertures 318, 320 (see FIGS. 14B, 14C) to receive the respective locking tabs 314, 316 to secure mating engagement of the tower 300 to the base pedestal 302 upon base support surface 312.

FIG. 14A shows pads 322 arranged as non-skid, high friction support elements along the bottom surface of the base 302. The pads 322 are arranged to contactingly engage the underlying base support surface (111, FIG. 2B) to provide stability during the sharpening operation based on the frictional interaction between the pads 322 and the underlying surface.

It will be noted that the frictional contact between the pads 322 and the underlying surface 111 can be selected to be sufficient to provide stability during the sharpening operation. At the same time, should the user fall or otherwise bump up against the exposed cutting surface of the blade clamped by the system, the system will be deflected along (scoot) against the underlying base support surface 111 to prevent cutting damage being imparted to the user.

It will be appreciated that any sharpening operation involves inherent risks, but the ability of the system to be shifted along the underlying surface 111 can reduce such risks to injury to the user during the sharpening operation, and therefore may be utilized in some embodiments. In other configurations, the risk of exposure to the exposed cutting edge may be ameliorated in other ways (including but not limited to shields, robotic actuation, etc.), and therefore in other cases it may be acceptable to clamp or otherwise affix the base assembly 110 to the underlying surface 111.

Continuing with FIG. 13, the tower 300 includes a base portion 324, a pair of opposing vertical support rails 326, 328 which extend from the base portion 324, and a horizontal support rail 330 which adjoins the vertical support rails 326, 328. The respective rails 326, 328 and 330 provide an open framework to facilitate operation of an adjustment mechanism 332 therein. The adjustment mechanism 332 is advanced and retracted in a vertical direction along a threaded shaft 334 and a cylindrical support shaft 336 responsive to user activation of a knob (screw mechanism) 338. The separate support shaft is merely illustrative for purposes of stability but is not necessarily required. Printed indicia regarding the relative elevation, and hence the imparted angle of the sharpening operation applied to the clamped blade by the abrasive assembly 130, is provided via indication panels 340, 342 that are arranged along the respective vertical support rails 326, 328. It will be appreciated that other arrangements can be utilized for the adjustment mechanism so that the arrangement shown is merely illustrative and is not limiting.

FIG. 13 further shows a receiving slot 350 in the base portion 324 of the tower 300 of the base assembly 110. The receiving slot 350 is adapted to receive the distal end 136 of the blade fixture 120, as discussed above in FIGS. 4A and 4B.

Figure 15:
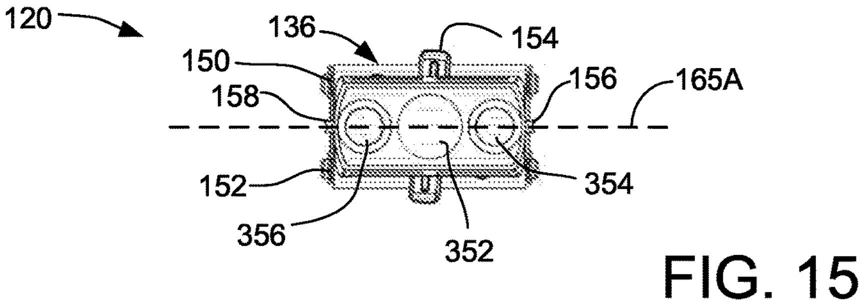
FIG. 15 is an end view of the blade fixture of FIG. 3 to illustrate mating insertion thereof into a receiving slot of the base assembly in FIG. 14B.

As shown more fully in FIGS. 14B and 15, the distal end 136 of the blade fixture 120 includes a number (in this case, three, 3) magnetic elements that are configured for magnetic interaction with a corresponding number (again, three, 3) elements within the receiving slot 350. As used herein, the term "magnetic element" will be understood as either a source of magnetic flux (as in the case of a magnet) or a magnetically permeable material, such as a ferromagnetic layer (e.g., a steel plate or other material with ferroelectric attractive properties, such as iron, etc.).

More particularly, without limitation the distal end 136 of the blade fixture 120 has a central magnet 352 and opposing ferroelectric plates 354, 356 on each side of the central magnet 352. Correspondingly, the receiving slot 350 has a central ferromagnetic member 362, characterized as a plunge pin as described below, and which is adapted to be magnetically coupled to the central magnet 352 of the blade fixture. For reference, the central magnet 352 corresponds to the magnet 172 discussed above in FIG. 5.

The receiving slot 350 further has opposing magnets 364, 366 which are adapted to magnetically engage the ferroelectric plates 354, 356 of the blade fixture 120. Other arrangements can be used so that this particular configuration is merely for purposes of illustration and is not limiting. Alternative configurations can include different respective numbers of magnetic elements, as well as other coupling mechanisms that do not utilize magnetic force to provide the required interlocking actions described herein.

Continuing with a review of FIG. 14B, it can be seen that the receiving slot 350 includes a recessed cup, or cylindrical recess member 370. The cup 370 is housed within the base assembly portion 324 of the tower assembly 300, and supports the aforementioned magnetic elements 362, 364 and 366. The cup 370 includes first and second (upper and lower) guide flanges 372, 374. The flanges 372, 374 are arranged to allow sliding engagement of the distal end 136 of the blade fixture 120 therebetween in close alignment therewith. The cup further includes projecting guides 376, 378. These projecting guides 376, 378 are configured to receive sliding engagement from the side rails 156, 158 on the sides of the blade fixture 120.

It will be noted at this point that the magnetic coupling of the respective magnetic elements 352, 354, 356 of the blade fixture 120 and the magnetic elements 362, 364, 366 of the receiving slot 350, as well as the mechanical interaction between the guide flanges 372, 374 and the upper and lower sides of the main body 132 of the blade fixture 120, and the mechanical interaction of the side rails 156, 158 with the projecting guides 376, 378, will induce a fixed mechanical orientation of the blade fixture 120, and hence the blade clamped thereby, within the receiving slot 350 of the base assembly 110.

Stated another way, the inserted blade fixture 120, once received into the receiving slot 350, is mechanically coupled thereto and is maintained in a fixed angular and translational position with respect to the base assembly 110 via the cup 370. This will nominally align plane 165B of the base assembly 110 with the central plane 165A of the clamp assembly 120. This is important because the cup 370 provides precise orientation and rotation of the blade fixture 120, which can be enacted through depression of a spring biased plunger 382 opposite the cup 370 (see FIG. 14C).

Figure 16A:
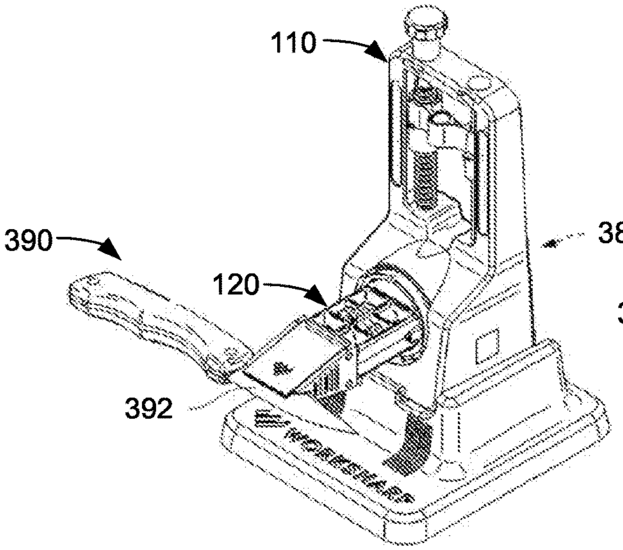
FIGS. 16A through 16C illustrate interaction of the blade fixture and the base assembly in conjunction with a sharpening operation upon a cutting tool.
Figure 16B:
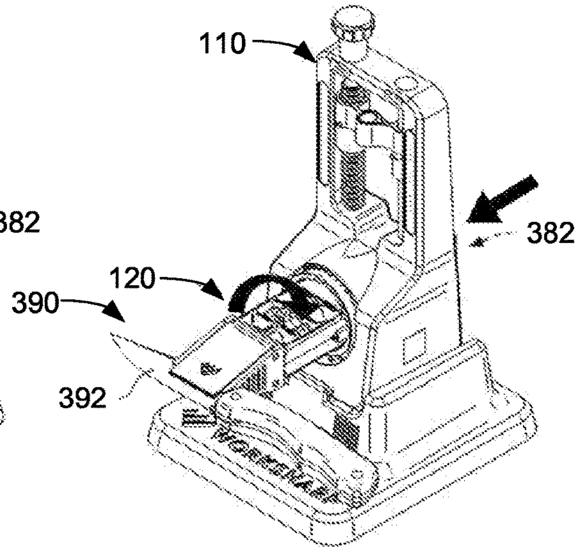
Figure 16C:
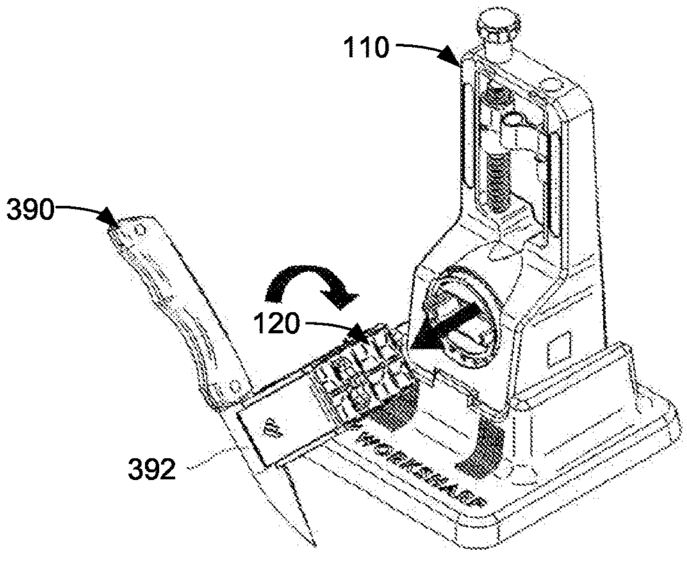

FIGS. 16A through 16C provide isometric depictions of a cutting tool sharpening operation upon a cutting tool 390 having a blade portion 392. Once clamped, the cutting tool 390 can be sharpened on a first side (FIG. 16A), and rotated within the base assembly by 180 degrees to facilitate sharpening of an opposing second side (FIG. 16B). The spring biased plunger 382 (FIG. 14C) is biased via an internal coiled spring (not separately shown). By depressing the plunger 382, the cup 370 (FIG. 14B) can be advanced and rotated 180 degrees, as controlled by internal locking tabs.

In this way, the user can depress the plunger 382 and rotate the tool 390 between the position in FIG. 16A and the position in FIG. 16B. Additional spring biased and locking mechanisms can be incorporated as desired, but are not shown for purposes of clarity. Alternatively, the user can remove the cutting tool and blade fixture combination, rotate the same 180 degrees, and then reinsert the combination back into the base assembly as depicted in FIG. 16C.

Figure 17A:
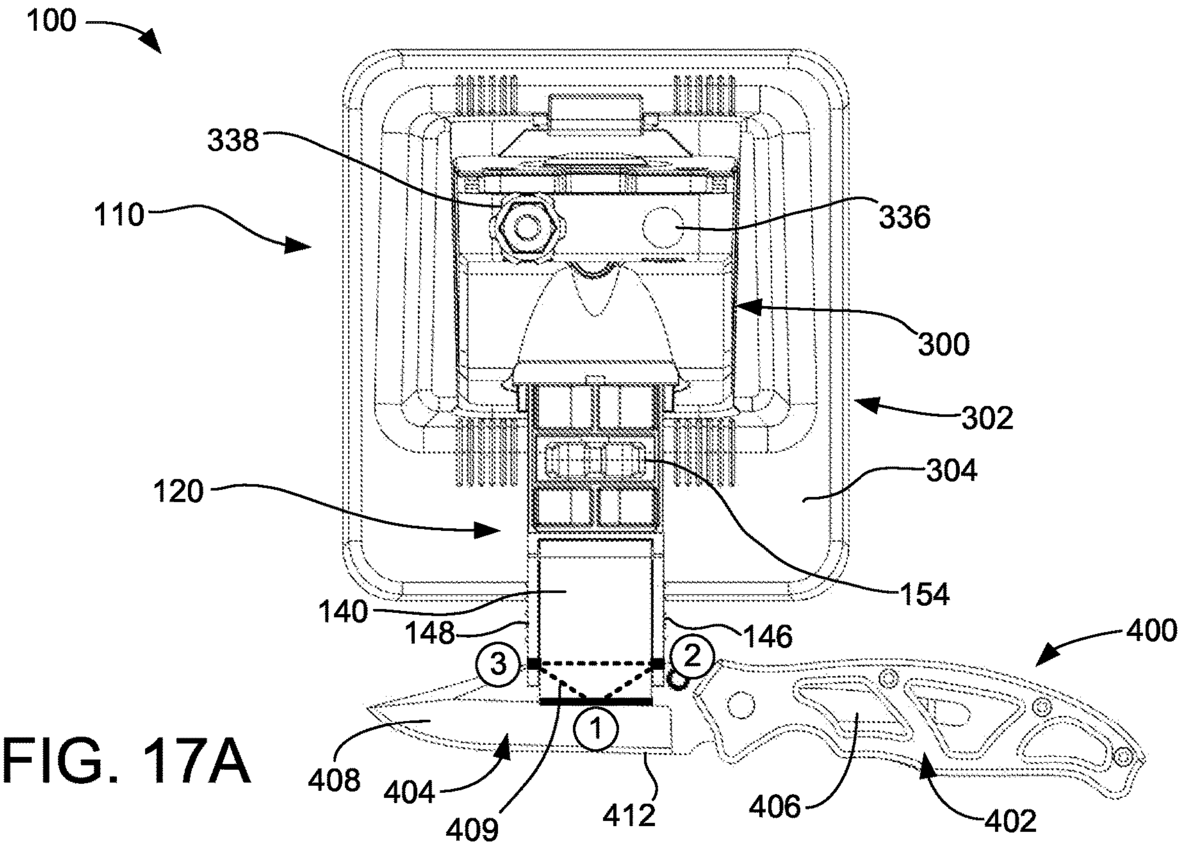
FIGS. 17A and 17B show respective top plan views of sharpening orientations upon a cutting tool by the sharpener.
Figure 17B:
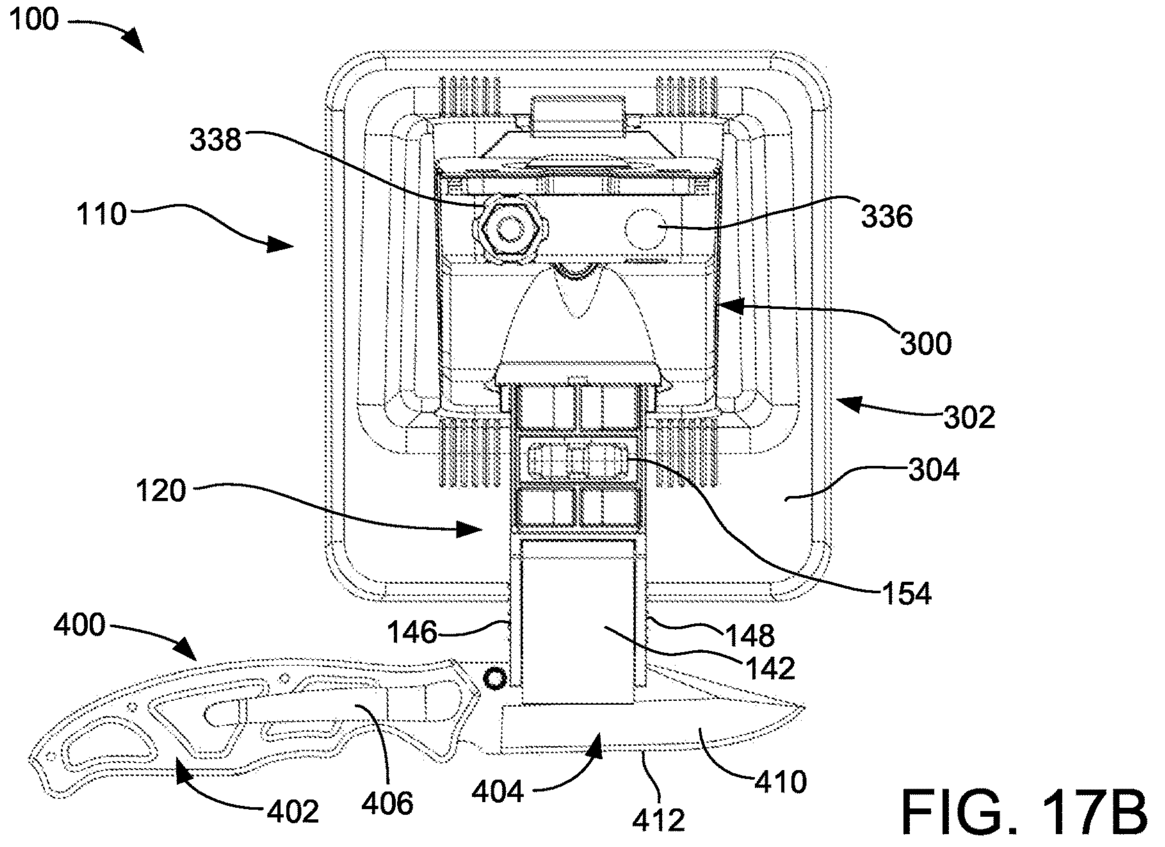

FIGS. 17A and 17B show top plan views of the base assembly 110 and the blade fixture 120 with another cutting tool 400. The cutting tool 400 is characterized as a foldable pocket knife, with handle 402 and blade 404. The blade 404 can be rotated into an extended position as shown, or can be retracted within the handle 402 in a folded position. A pocket clip 406 is affixed to the handle 402 to enable convenient placement of the folded pocket knife in a user's pocket.

The blade 404 includes opposing sides 408, 410 which converge to a cutting edge 412 which is sharpened using the abrasive assembly 130 (see FIG. 2C). Side 408 is sharpened in the configuration of FIG. 17A, and side 410 is sharpened in the configuration of FIG. 17B. Depression of the plunger 382 (FIG. 14C) enables the user to rotate the knife 400 between the respective orientations of FIGS. 17A and 17B during a sharpening sequence, as described above. Alternatively, the user can remove the combination of the blade fixture 120 and the knife 400, rotate the same in free space, and reinsert both into the base assembly 110, as depicted above in FIG. 16C.

An aspect of the sharpener is a spaced apart multi-point contact arrangement provided by the blade fixture 120. This contact arrangement is denoted generally by broken-line triangle 409 and blackened contact areas in FIG. 17A. Contact points are generally denoted at "1", "2" and "3". The contact points are generally along the proximal end of the clamping jaws 140, 142, and each of the respective alignment grooves 192 on each side of the clamping jaws. It will be noted that these contact points are located between the respective proximal and distal ends of the jaws. This stabilizes and centers the blade within the blade fixture 120.

In the configuration of FIG. 17A, it will be noted that contact is provided along the entirety of the lengths of the respective jaws 140, 142 (e.g., contact area "1") via the embedded compliant material 160, 162 (see FIG. 5), so reference to multi-point contact, or triangular contact, is not necessarily limited to equally sized contact areas. It will be noted, for example, that a four (or more) point contact area could be easily established by segmenting the compliant material 160, 162 (or other contact features) into discrete segments that individually contact the blade, and the same result would be obtained. Nevertheless, those having skill in the art will recognize that multiple spaced apart points (or areas) of contact are usually required to establish a plane, and therefore the three-point contact arrangement provided by the blade fixture 120 does this.

Technically speaking, there are six points of contact (three on each side of the blade) by the blade fixture in FIG. 17A, counting the opposing contacts provided by each of the upper and lower jaws and the centering guides, in order to hold the blade in the desired orientation. Additional or fewer points of contact are clearly contemplated and included within the scope of the present disclosure, and so the term multi-point contact will be understood to cover at least two spaced apart points on contact on at least side of the blade, and additional points are in no way limited to the embodiments illustrated in the drawings.

Figure 18A:
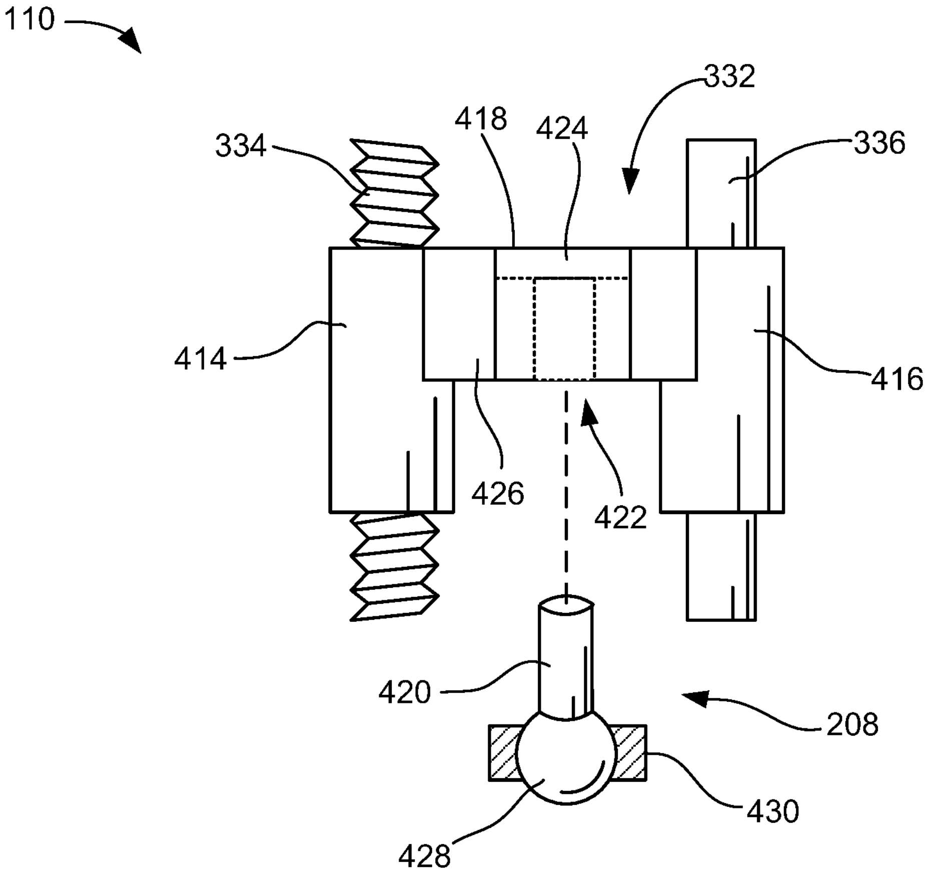
FIGS. 18A and 18B are simplified schematic representations of an adjustment mechanism of the base assembly.

FIG. 18A shows further aspects of the adjustment mechanism 332 of FIG. 13 in combination with the engagement mechanism 208 of FIG. 9. As described above, the adjustment mechanism 332 is moved vertically along the threaded shaft 334 and the cylindrical shaft 336 via user rotation of the threaded shaft by the knob 338 (see FIGS. 14B and 14C) to set the desired sharpening angle applied to the rod 202 of the abrasive assembly 130.

Figure 18B:
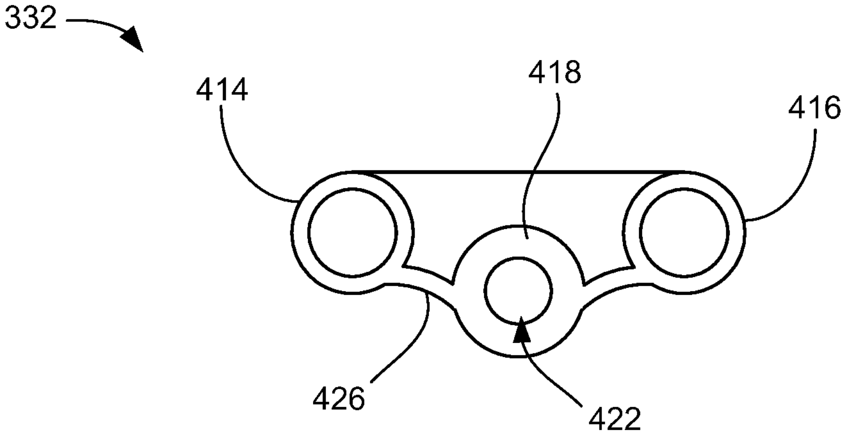

The adjustment mechanism 332 includes a threaded member 414 which engages the threaded shaft 334, a cylindrical member 416 which slidingly engages the cylindrical shaft 336, and a central member 418 which receivingly engages a rod 420 of the engagement mechanism 208. A central aperture 422 extends upwardly into the member 418. An embedded magnet 424 is used to retain the rod 420 within the aperture 422. Webbing 426 interconnects the respective members 414, 416, and 418, as further illustrated in FIG. 18B.

The engagement mechanism 208 at the end of the rod 202 has a cylindrical ball 428 coupled to the rod 420 which is embedded within a housing 430 to form a ball-socket joint arrangement. Both the adjustment mechanism 332 and the housing 430 of the engagement mechanism 208 can be formed of injection molded plastic or other suitable material.

Figure 19A:
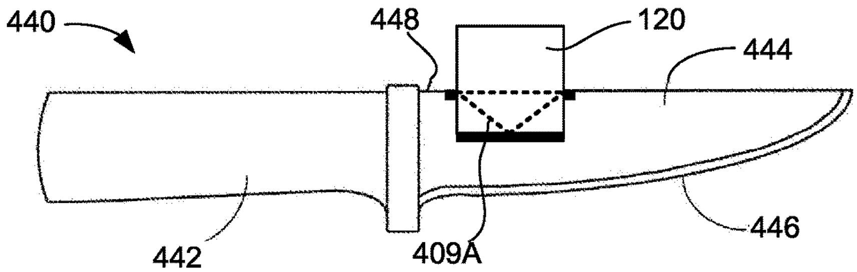
FIGS. 19A through 19C illustrate different types of cutting tools (e.g., knives) that can be sharpened by the sharpener.
Figure 19B:
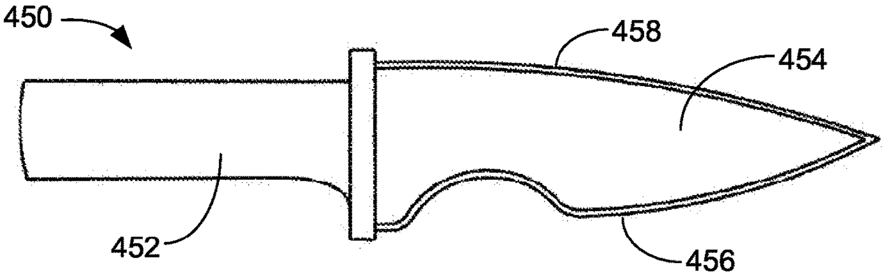
Figure 19C:
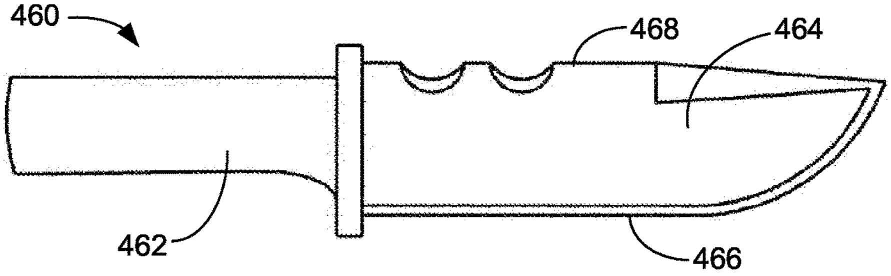

FIGS. 19A through 19C show further examples of cutting tools 440, 450 and 460 that can be sharpened by the sharpener 100 in accordance with various embodiments. FIG. 19A shows the cutting tool 440 as a kitchen knife with handle 442 and blade 444 extending therefrom with curvilinearly extending cutting edge 446 and opposing spine 448. A portion of the blade fixture 120 is shown affixed to a medial portion of the knife 440. A multi-point contact arrangement on the first side of the blade 444 is denoted at 409A. A similar multi-point contact arrangement is contemplated on the second side of blade 444 (not shown).

FIG. 19B shows a double sided knife 450 with handle 452, blade 454 and opposing cutting edges 456, 458. Sharpening the knife 450 can include presenting a first cutting edge (e.g., 456) for sharpening, followed by presenting the opposing second cutting (back or spine) edge (e.g., 458), while clamping the respective sides of the knife in turn as generally depicted in FIG. 19A. It is anticipated that a second cutting edge may be formed on the spine (back edge 458). Both cutting edges may be sharpened by subsequently bringing each edge (456 or 458) into contact with the guide to present the respective opposing edge (456 or 458) for sharpening.

FIG. 19C shows yet another knife 460 generally characterized as a Bowie knife with handle 462, blade 464, cutting edge 464 and spine 468. The spine includes various cutting features such as a back blade and scalloped regions, which can be individually sharpened using the sharpener as desired, or via other sharpening mechanisms.

Figure 20A:
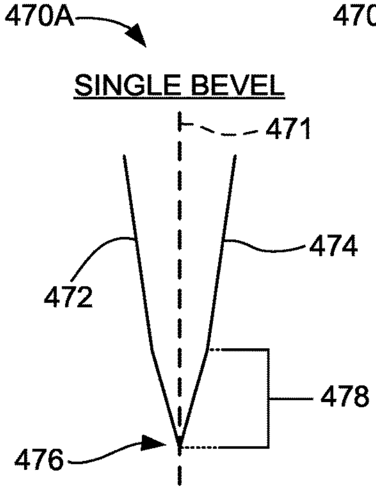
FIGS. 20A through 20C show different sharpening geometries that can be achieved upon a cutting tool by the sharpener in some embodiments.
Figure 20B:
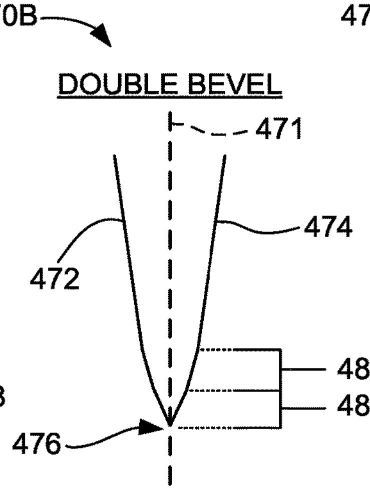
Figure 20C:
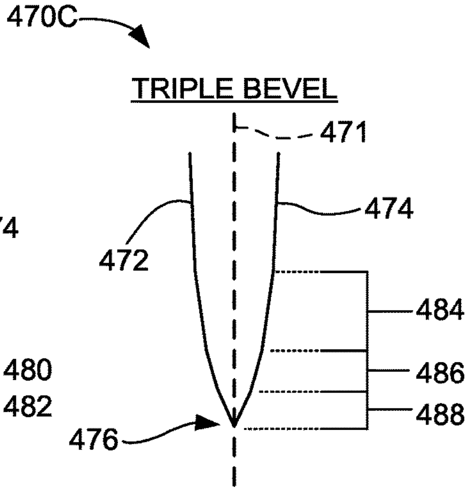

FIGS. 20A through 20C show different sharpening geometries that can be applied to the various blades depicted herein, including but not limited to the cutting tools 10, 190, 400, 440, 450 and 460. FIGS. 20A-20C show respective blades 470A, 470B and 470C, each having main side surfaces 472, 474 which taper to a cutting edge 476.

The blade 470A in FIG. 20A has a single bevel geometry, with a single bevel 478 that extends on each side of the blade to the cutting edge 476. This configuration can be obtained by performing one or more sharpening operations upon the blade 470 using the various abrasive members 222, 224 and 226 all at the same adjusted angle using the adjustment mechanism 332 in FIGS. 18A and 18B. Any suitable angle can be provided for the beveled region 478, such as on the order of around 20 degrees with respect to a bisecting axis 471. It will be understood that the bisecting axis 471 is collinear with the central blade plane 165 discussed above (see e.g., FIGS. 1B and 5).

The blade 470B in FIG. 20B has a double bevel geometry, with two beveled regions 480 and 482 on each side of the blade. This geometry can be obtained by performing a first sharpening operation with a first abrasive member, such as the member 224 at a first angle (such as about 20 degrees), followed by a second operation with a second abrasive member, such as the member 226 at a second, larger angle (such as about 25 degrees). The greater angle of the beveled region 482 can enhance durability of the cutting edge 476.

The blade 470C in FIG. 20C has a triple bevel geometry, with three beveled regions 484, 486, and 488 on each side of the blade. Each of these bevels has an successively increased sharpening angle (e.g., 20 degrees, 23 degrees, 26 degrees, etc.) obtained using each of the respective abrasive members 222, 224, 226. Other precise sharpening geometries can be obtained as desired, including beveled surfaces separated by as little as a single degree or less, depending upon the fine adjustment of the mechanism 332 applied by the user. The respective beveled surfaces in FIGS. 20A-20C are linear (e.g., flat) because the corresponding abrasive surfaces of the abrasive members 222, 224, 226 (see FIG.

12A) are flat. Other geometries can be provided however; convex abrasive surfaces will tend to impart concave beveled surfaces, etc.

Figure 21:
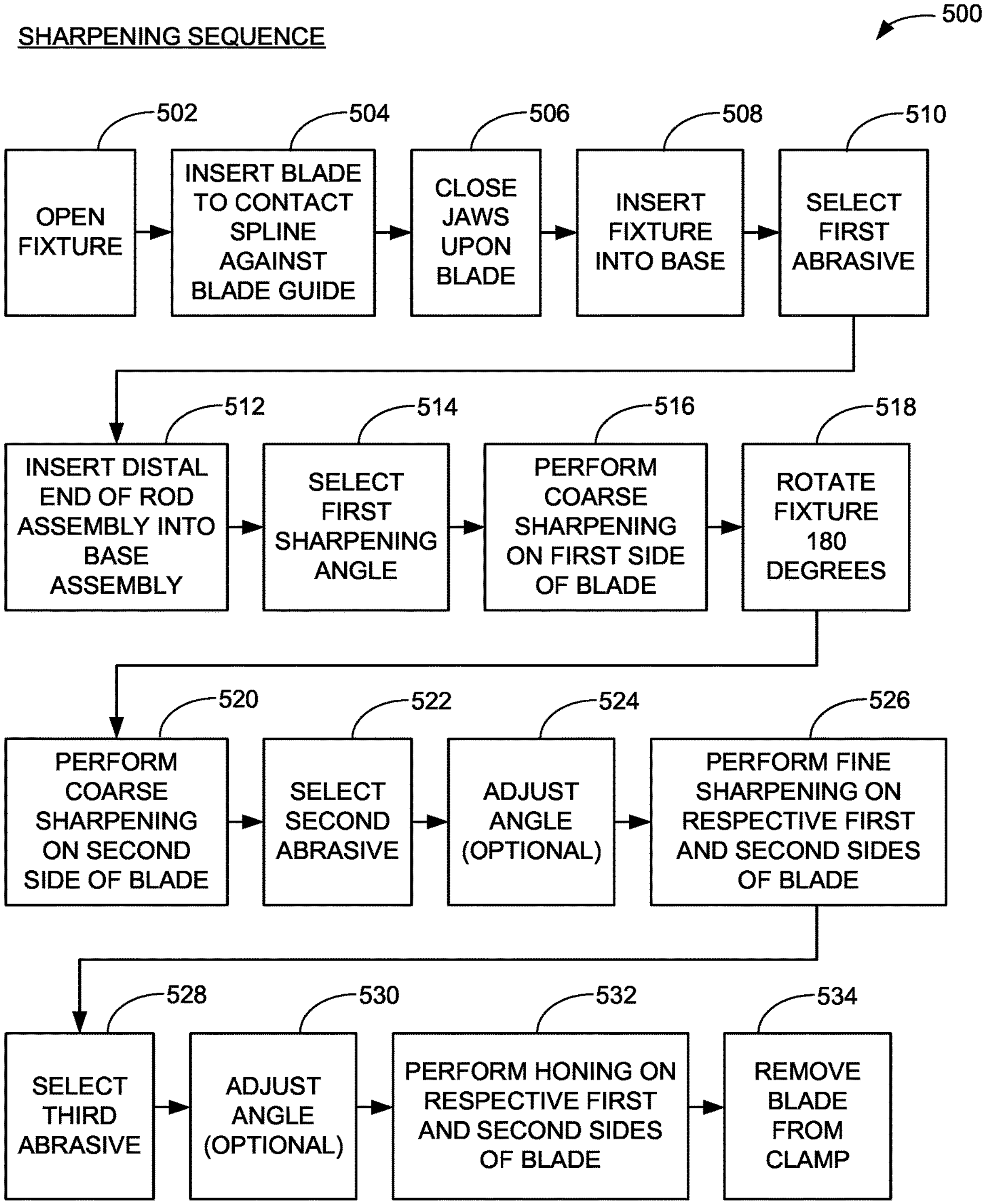
FIG. 21 is a flow sequence for a sharpening operation carried out in accordance with some embodiments.

FIG. 21 is a flow diagram 500 to illustrate a sharpening sequence that can be carried out upon a selected cutting tool, such as the kitchen knife 10 in FIGS. 1A-1B, using the sharpener 100. It will be appreciated that the sequence in FIG. 21 is merely illustrative and is not limiting, so that other steps can be carried out as desired.

The sequence commences at block 502 where the blade fixture 120 is opened to receive the blade of the knife, which is inserted between the respective clamping jaws 140, 142. It is contemplated that the spine or otherwise opposing side of the blade opposite the cutting edge to be sharpened will be brought into contacting engagement with one or more guides (see e.g., FIGS. 8A-8D), block 504, after which the jaws are tightened onto the sides of the blade through user activation of the knob 154, block 506.

At block 508, the distal end 136 of the blade fixture 120 is inserted into the base 110 through placement into the receiving slot 350, as described above in FIG. 16. A first abrasive member is selected at block 510; it is contemplated that the flow of FIG. 21 will utilize the triangular arrangement of FIG. 12A and will apply all three abrasive members to the blade in turn. In practice, the first abrasive member may be only utilized periodically to provide coarse shaping, so that routine touch up sharpening operations on a previously sharpened tool may only involve the second and/or third abrasive member. In this example, however, the first abrasive member 222 is selected at block 510. This will include user rotation of the cartridge 212 within the housing 210 to present the first abrasive member 222 in facing relation away from the handle 220 (see FIGS. 9, 10A-10B).

The abrasive assembly 130 is attached to the base assembly 110 at block 512. This includes insertion of the rod 420 into slot 422, as described above in FIG. 18A. This couples the distal end of the abrasive assembly 130 (via rod 202) to the base assembly. A first sharpening angle is selected at block 514. This can include user rotation of the knob 338 to advance the adjustment mechanism 332 to a suitable angle. The printed indicia (340, 342 in FIG. 14B) can be used to precisely set a desired sharpening angle. A digital angle guide could also be used to determine the correct angle as desired. As noted above in FIGS. 20A-20C, a suitable initial angle can be about 20 degrees, although other values can be used.

At block 516, a coarse sharpening operation is carried out by the user using the abrasive assembly 130. This involves grasping of the handle 220 by the user and lightly moving the first abrasive member along the entirety of the exposed cutting edge of the clamped blade. Care should be taken to keep the user's hands away from the clamped blade. Long strokes along the entirety of the cutting edge, such as 8-10 strokes, may be sufficient to carry out the coarse sharpening operation. Damaged areas can be provided additional motion of the sharpening member therealong. A small amount of residue (swarf) will likely be generated as a result of the sharpening operation. This swarf can be carefully wiped off between sharpening operations using a cloth or other suitable member.

Once the coarse sharpening operation has been applied to the first side of the blade, the blade can be rotated 180 degrees at block 518 to present the second, opposing side of the blade for sharpening. This rotation can be carried out as described above in FIG. 16, whereby the user depresses the mechanism 382, allowing the blade fixture and cup to be rotated through this desired angular range. Alternatively, the user can carefully pull the fixture and blade out of the receiving slot, rotate the same, and then reinsert in the desired configuration.

At block 520, a coarse sharpening operation is carried out upon the second side of the blade as described above. It is contemplated albeit not necessarily required that the sharpening operations using the same abrasive media will be carried out at the same nominal angle on both sides of the blade, thereby providing a symmetric sharpening geometry as depicted in FIGS. 20A-20C.

Once the coarse sharpening operation is completed, the flow passes to block 522 where a second abrasive is selected, such as abrasive member 224 (see e.g., FIG. 12A). As desired, an adjustment can be made to the sharpening angle at block 524 at this time, such as by increasing the angle by a small amount (e.g., 2-5 degrees, etc.). The foregoing sharpening operations are repeated at block 526 so that the second abrasive member 224 is again lightly moved by the user along opposing sides of the blade along the cutting edge. The first sharpening operation may have raised a burr along the cutting edge; if so, the fine sharpening operation of block 526 will tend to remove this burr. A total of 8-10 strokes may be sufficient to complete this sharpening on each side.

Once the fine sharpening operation is completed, the flow passes to block 528 where the third abrasive is selected, such as the abrasive member 226. An adjustment to the sharpening angle can be optionally carried out at block 530, after which a honing operation is applied at block 532 using the third abrasive member. This will polish and otherwise refine the cutting edge to an exceptional level of sharpness. As before, the honing operation is applied to each side of the blade in turn (such as 8-10 strokes). Once completed, the blade is removed from the clamp, block 534.

It is contemplated albeit not necessarily required that the various sharpening elements of the system 100 will be used in conjunction in the manner described above (including the arrangement of FIGS. 2A-2C) to hold a blade to be sharpened in a fixed position while an abrasive block is moved along a cutting edge thereof. However, such is not necessarily required. That is the blade fixture and/or the abrasive block assembly can be used separately from the sharpening system 100, as will now be discussed.

Figure 22:
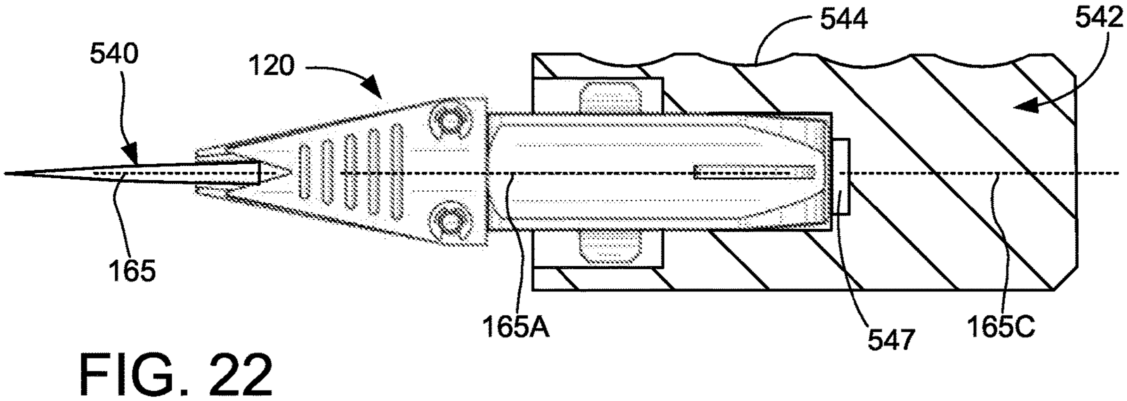
FIG. 22 shows the blade fixture of FIG. 3 in conjunction with a user handle in accordance with further embodiments.

FIG. 22 shows the blade fixture 120 with a corresponding blade 540 clamped therein. The blade fixture 120 is shown to be inserted into a handle 542. The handle 542 has an outer surface 544 adapted to be grasped by the hand of a user. This allows the blade to be safely mounted within the blade fixture 120 and manipulated by the user in three-dimensional (3D) space during manual sharpening operations separate from the sharpener 100. It will be noted that the handle 542 maintains the cutting edge of the blade 540 (denoted at 546) up and away from the user's hand during such manipulations.

An embedded magnetically permeable plate 547 can be housed within the handle 542 to establish a magnetic interaction circuit with the facing magnet 352 (see FIG. 15) to ensure retention of the blade fixture 120 within the handle due to the magnetic interaction between the magnet 352 and the plate 546. Grooves can be provided (not shown) to receivingly engage the side rails 156, 158 of the blade fixture 120 to maintain the mechanical interconnection between the blade fixture 120 and the handle 352 during these manipulative operations.

As before, the blade fixture 120 is arranged to align central blade plane 165 with central fixture plane 165A. Upon insertion, these planes further align with a central handle plane 165C.

Figure 23:
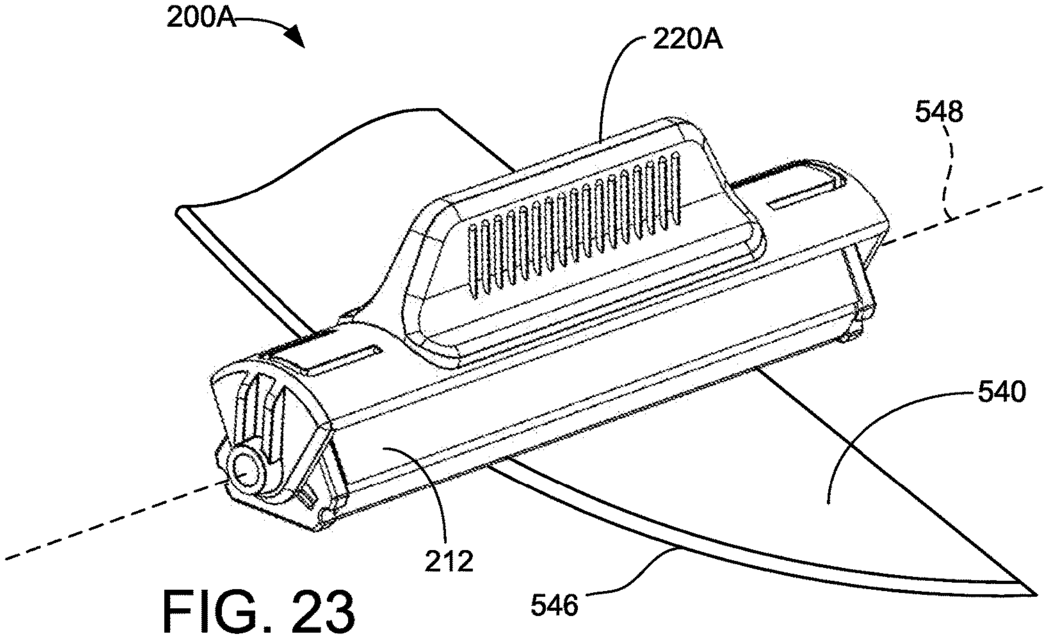
FIG. 23 is another depiction of the abrasive block of the sharpener.

FIG. 23 shows an abrasive block 200A that generally corresponds to the abrasive block 200 in FIG. 9. The abrasive block 200A is similar to the abrasive block 200 but is detached from the corresponding rod 202. This allows the block 200A to be manipulated by the user during manual sharpening operations separate from the sharpener 100. Different sizes, shapes and aspect ratios can be applied to the abrasive block 200A as required. The abrasive block 200A is shown to be adapted for attachment to rod 202, but such is not required.

During sharpening, the user can manipulate the separate abrasive block 200A along a desired sharpening axis, as depicted at 548. In some cases, the blade to be sharpened (e.g., 540) can be supported using a first hand of the user, and sharpened using the freely moveable block 200A in FIG. 23 that is grasped by a second hand of the user via a user handle 220A. The blade can be secured by a clamp and handle arrangement as in FIG. 22, although such is not required (e.g., the block 200A can be used while the user holds the knife by the knife handle, etc.).

Any number of different types of abrasive members can be incorporated into or otherwise attached to the abrasive blocks 200, 200A. This includes, but is not limited to, whet stones, diamond plates, ceramic rods, leather strops, lapping films, etc. Attachment mechanisms that can be used to couple such abrasive members can include, but are not limited to, springs, clamps, screws, brackets, magnets, etc.

Figure 24A:
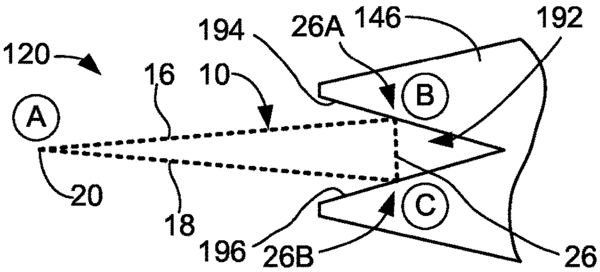
FIGS. 24A and 24B show different configurations of the guide for the clamp assembly of FIG. 3 in some embodiments.

FIG. 24A shows another view of the multi-point contact arrangement achieved by the blade fixture 120 upon a cutting tool such as the knife 10 described above. The cutting edge 20 is positioned at a selected point in space denoted at “A”. The spine (or back edge) 26 of the knife is wedged into the notch 192 so that an upper corner junction 26A of the spine 26 contacts converging groove surface 194 (point “B”), and a lower corner junction 26B of the spine 26 contacts converging groove surface 196 (point “C”). Contact points B and C stabilize the spine of the blade within the blade fixture 120 and center the spine (back edge) within the notch 129.

The clamping end of the upper clamping jaw (not shown) contacts side 16 of blade 10 between points A and B. The clamping end of the lower clamping jaw (also not shown) contacts the opposing side 18 of blade 10 between points A and C. The resulting combined spaced apart multiple areas of contact precisely position the central blade plane 165 to be coplanar with the central fixture plane 165A. The spaced apart contacts provide a stable and secure clamping of blade 10 in fixture 120. When both points B and C are engaged in conjunction with the contact points between A-C and A-B, the knife is stable and centered with respect to central fixture plane 165A.

Figure 24B:
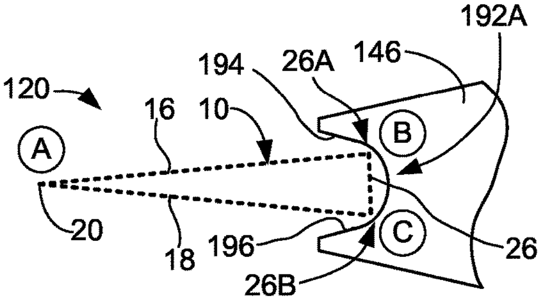

While the converging surfaces 194, 196 are shown to be flat (linear), such is not necessarily required as other configurations can be used. FIG. 24B shows another configuration for the fixture 120 with a u-shaped notch 192 with curvilinearly extending, converging surfaces 194A, 196A that operate upon corner junctions 26A, 26B to provide centering operations upon the blade 10 as before.

Figure 25:
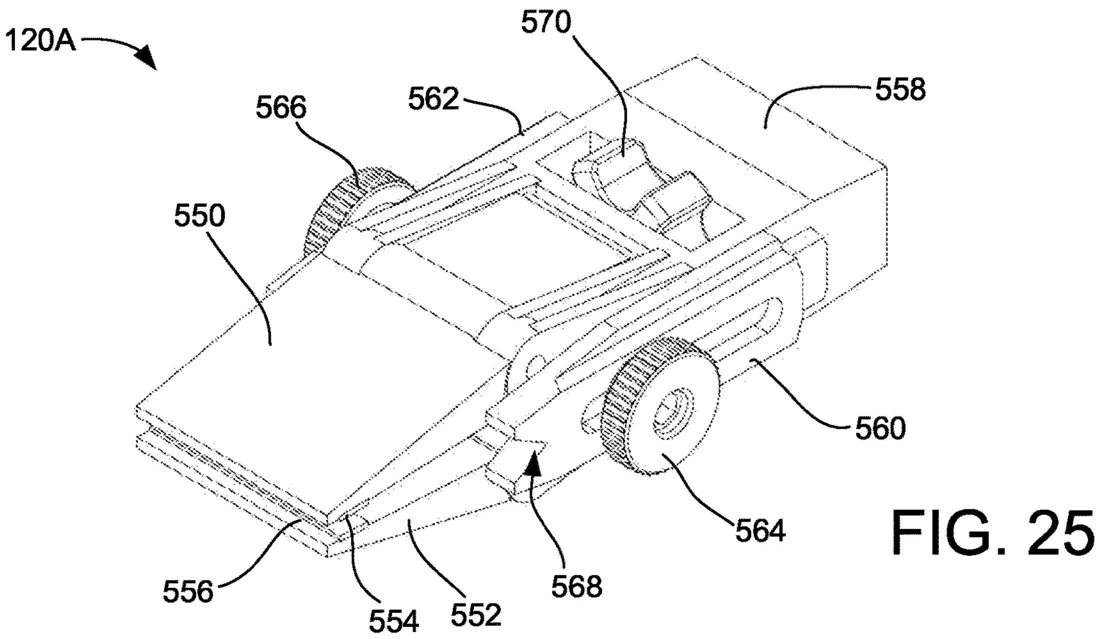
FIG. 25 shows an alternative blade fixture that can be used in accordance with further embodiments.

FIG. 25 shows an alternative blade fixture 120A that can be used with the various embodiments described above. The blade fixture 120A is similar to the blade fixture 120 in that the assembly 120A includes upper and lower jaws 550, 552 with embedded compliant layers 554, 556. A main body assembly 558 supports adjustable guides 560, 562 which can be individually extended or retracted and thereafter fixed in place via knobs 564, 566. Each guide 560, 562 incorporates a generally v-shaped notch 568. As before, clamping force between the jaws 550, 552 can be increased or decreased through a knob 570.

Figure 26A:
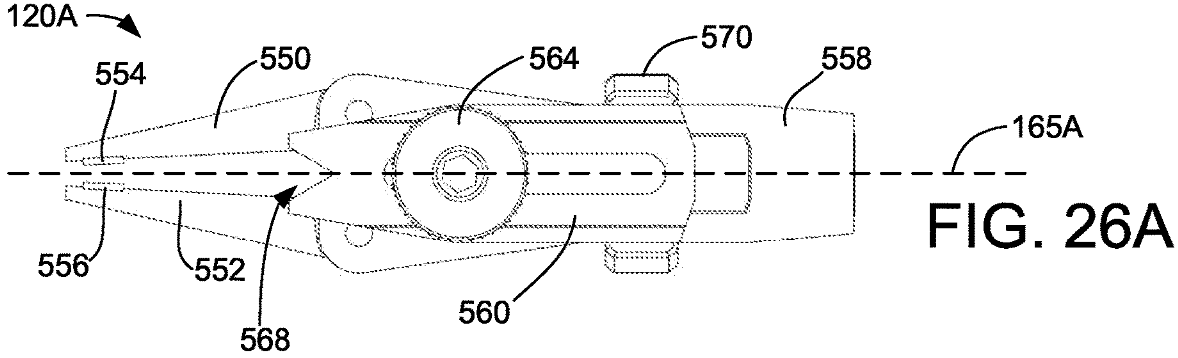
FIGS. 26A and 26B provide side elevational views of the blade fixture of FIG. 25 to illustrate adjustable guides thereof.
Figure 26B:
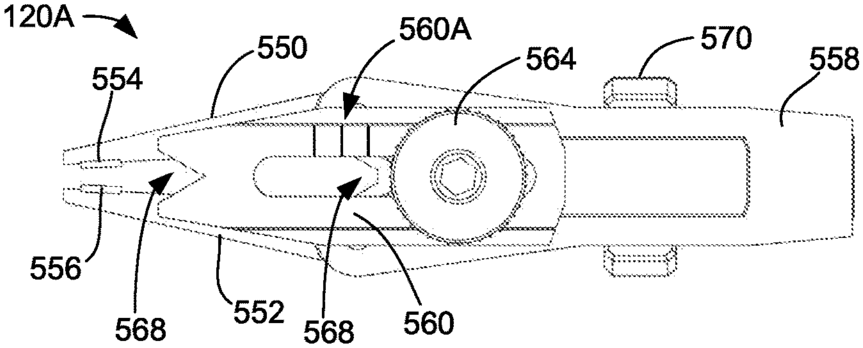

FIG. 26A shows the respective guides 560 in a retracted position to accommodate blades with a larger width dimension W (see FIGS. 1A-1B). FIG. 26B provide the guides 560, 562 in an extended position to accommodate blades with a smaller width dimension W.

Figure 26C:
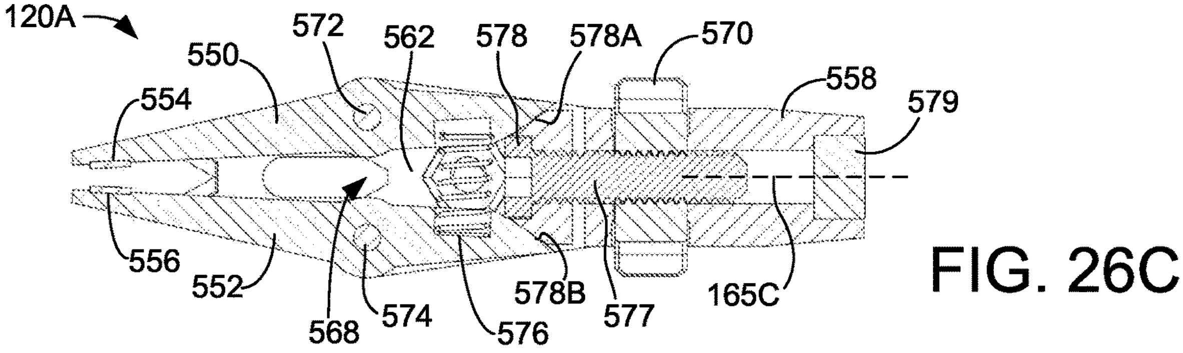
FIG. 26C is a cross-sectional view of the blade fixture of FIG. 25.

FIG. 26C is a cross-sectional view to show a retraction mechanism which includes pivot shafts 572, 574 about which the respective jaws 550, 552 rotate. An internally disposed spring 576 exerts a biasing force between the jaws to urge the jaws in a closed position. A threaded shaft 577 has a thrust member 578 which operates upon surfaces 578A, 578B. In one contemplated mode of operation, the thrust member 578 is retracted using knob 570, the user squeezes the distal (back) ends of the jaw members to open the same, inserts the blade to the desired centered position using the adjusted guides 560, 562, releases the jaws to allow the jaws to clamp onto the blade, and then tightens the assembly to advance the thrust member 578 and lock the blade fixture into place. Element 579 in FIG. 26C can be a magnetically permeable element, such as a magnet or a ferroelectric plate, to facilitate secured engagement of the fixture 120A in an associated receptacle.

The adjustability of the guides 560, 562 enables any number of different shapes and configurations of blades to be clamped by the blade fixture, but could change the insertion depth of the blade. Indicia could be placed on the side of FIGS. 26A and 26B to show markings that can act as reference for the user in order to return the adjustable guides to the same position for future sharpenings of the same knife. One such indica set is indicated at 560A in FIG. 26B. The differences in shapes and configurations of knives can include different widths of blades, different shapes of the spine (or second back edge) opposite the cutting edge, etc.

Figure 27A:
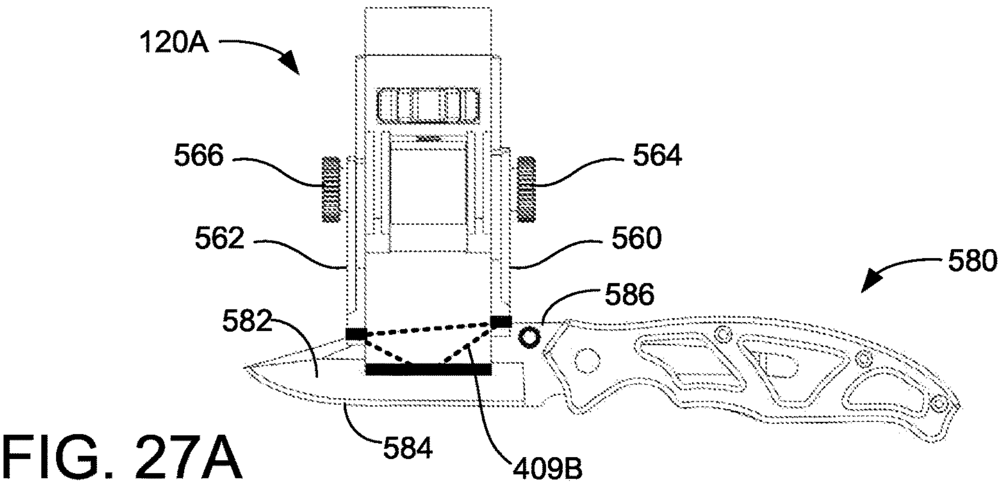
FIGS. 27A and 27B are top plan views of the blade fixture of FIG. 25 with different knives having different geometries.

FIG. 27A shows the blade fixture 120A affixed to a pocket knife 580 with blade 582, cutting edge 584 and spine 586. A spaced apart, multi-point contact arrangement is denoted at 409B. The guide 562 has been advanced farther forward than the guide 560 to accommodate the shape of the spine 586 and nominally present the cutting edge 584 along a suitable path for sharpening.

Figure 27B:
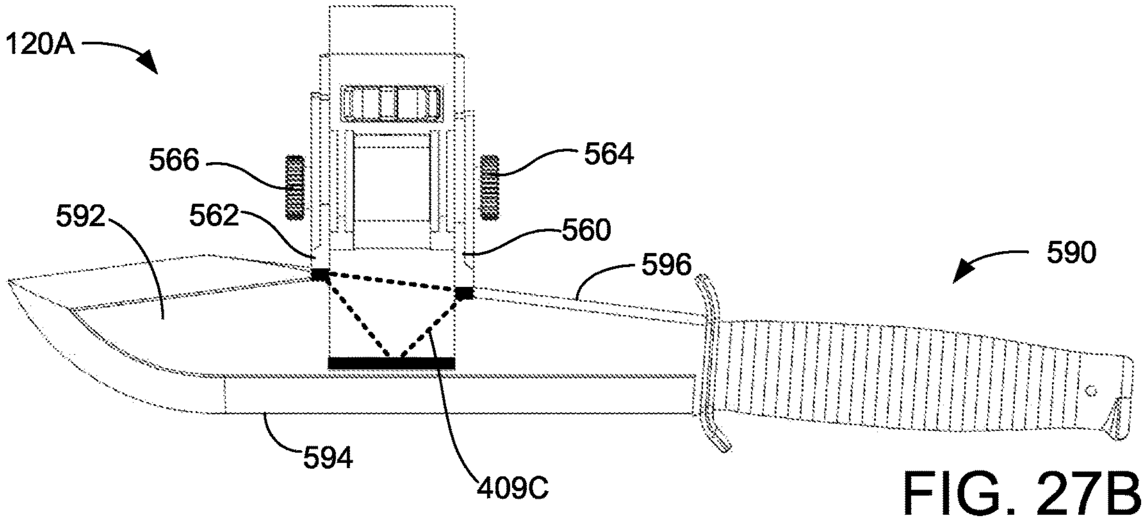

FIG. 27B shows another arrangement of the blade fixture 120A affixed to a Bowie knife 590. The knife 590 is significantly larger than the knife 580 and includes blade 592, cutting edge 594 and spine 596. A multi-point contact arrangement is shown at 409C. In this case, side rail 560 is farther forward than side rail 562 to once again establish a suitable sharpening path. From a comparison of FIGS. 27A and 27B, both knives 580 and 590 can be arranged such that a long extent of the respective cutting edges 584, 594 can be arranged to be nominally parallel to the clamping ends of the jaws 550, 552 and nominally orthogonal to the side rails 560, 562. This sharpening arrangement is contemplated but is not necessarily required.

Figure 27C:
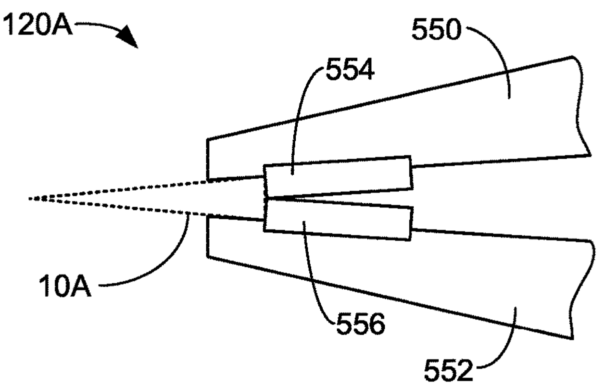
FIG. 27C shows the blade fixture of FIG. 25 securing a relatively small (e.g., pen) knife.

FIG. 27C shows yet another arrangement for the blade fixture 120A, this time to clamp a small pen knife 10A. In this case, the pen knife 10A is similar to but significantly smaller than the knife 10 in FIGS. 1A-1B and may be, for example, a small selectable blade from a multi-blade pocket knife or other tool. Because the knife 10A has such a small width dimension, the knife 10A can be inserted between the tips of the jaws 550, 552, and the respective compliant layers 554, 556 can provide a backing surface to provide a multi-point contact arrangement as before to center and secure the knife. In this case, the layers 554, 556 serve as a backing layer and the material that forms the jaws 550, 552, at the ends thereof, contactingly engage the opposing side surfaces of the blade. In this way, the knife 10A is pinched at the end of the jaws, but nonetheless is held in a stable and secure fashion for sharpening as before.

FIG. 27C demonstrates that small width blades can extend from the clamping end enough to be sharpened by the abrasive assembly without the abrasive member interfering with the clamping fixture. It is noted that this small blade, when clamped as shown, does not have multiple spaced apart points of contact and is therefore not held as precisely or securely as larger blades that are brought into contact with the guide.

Figure 28:
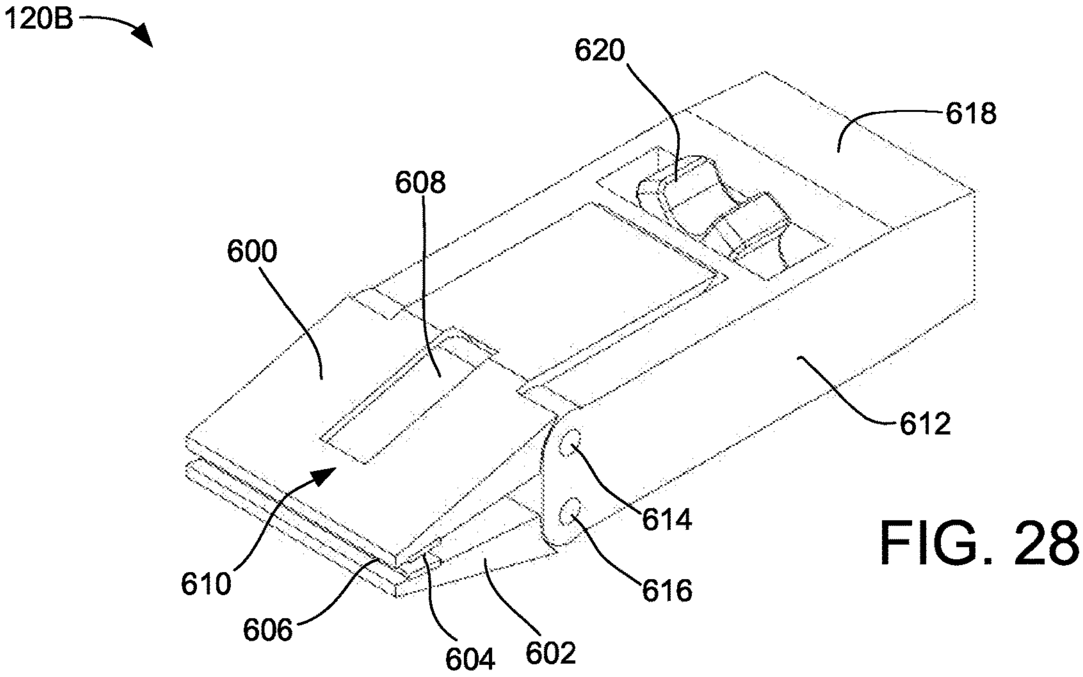
FIG. 28 shows another alternative blade fixture that can be used with further embodiments.
Figure 29A:
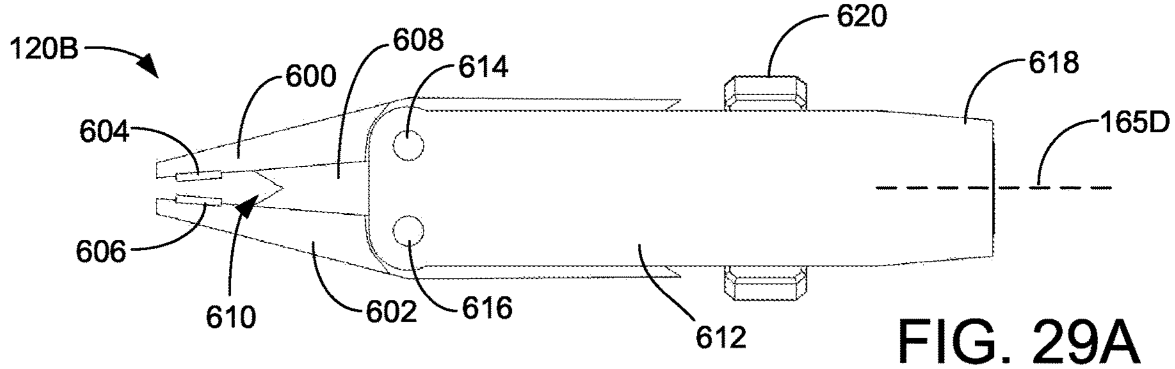
FIGS. 29A and 29B show respective side-elevational and top plan views of the blade fixture of FIG. 28.
Figure 29B:
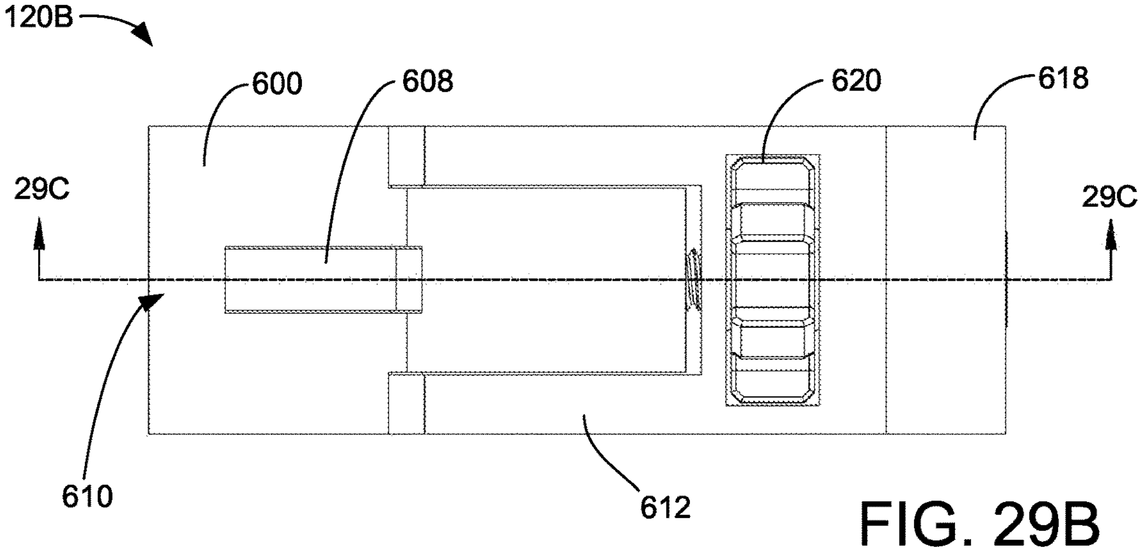

FIG. 28 shows another alternative blade fixture 120B. FIG. 29A is a side-elevational view, and FIG. 29B is a top plan view. The blade fixture 120B is similar to the blade fixtures 120, 120A discussed above. One notable difference is the use of a single central guide arrangement to center and secure the cutting tool being sharpened.

To this end, the blade fixture 120B has opposing top and bottom jaws 600, 602 with compliant layers 604, 606. A single, central guide 608 extends through apertures (not separately designated) in the top and bottom jaws 600, 602. The central guide 608 has a v-shaped notch 610 similar to such guides described above. A main body 612 supports upper and lower pivot shafts 614, 616, to enable pivotal motion of the jaws 600, 602 between an open and closed position. A distal end 618 of the blade fixture 120B can be configured for mating engagement with the base assembly 110 as described above. A knob 620 can operate to selectively open and close the jaws as before.

Figure 29C:
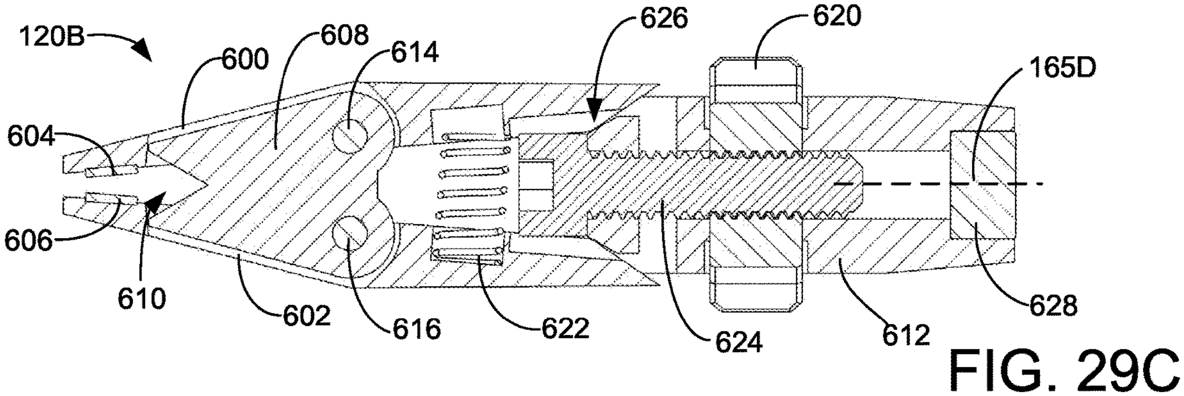
FIG. 29C is a cross-sectional view of the blade fixture along line 29C-29C in FIG. 29B.

FIG. 29C is a cross-sectional view taken along line 29C-29C in FIG. 28B. A retraction mechanism includes an interior coiled spring 622 which biases the jaws 600, 602 in the closed position as before. A threaded shaft 624 is engaged by knob 620 and includes a thrust member 626. The blade fixture 120B operates in a manner similar to the blade fixture 120A, except that the user utilizes the single central guide 608 to engage the spine of the knife during the clamping operation. The single central guide provides stable points of contact at a single position along the spine of the blade. This is beneficial for blades where the spine is not straight and/or substantially non-parallel to the cutting edge. This allows the user to adjust the cutting edge of the blade nominally parallel to the clamping ends of jaws 600 and 602 while keeping the spine in contact with the converging surfaces of guide notch 610.

Figure 30:
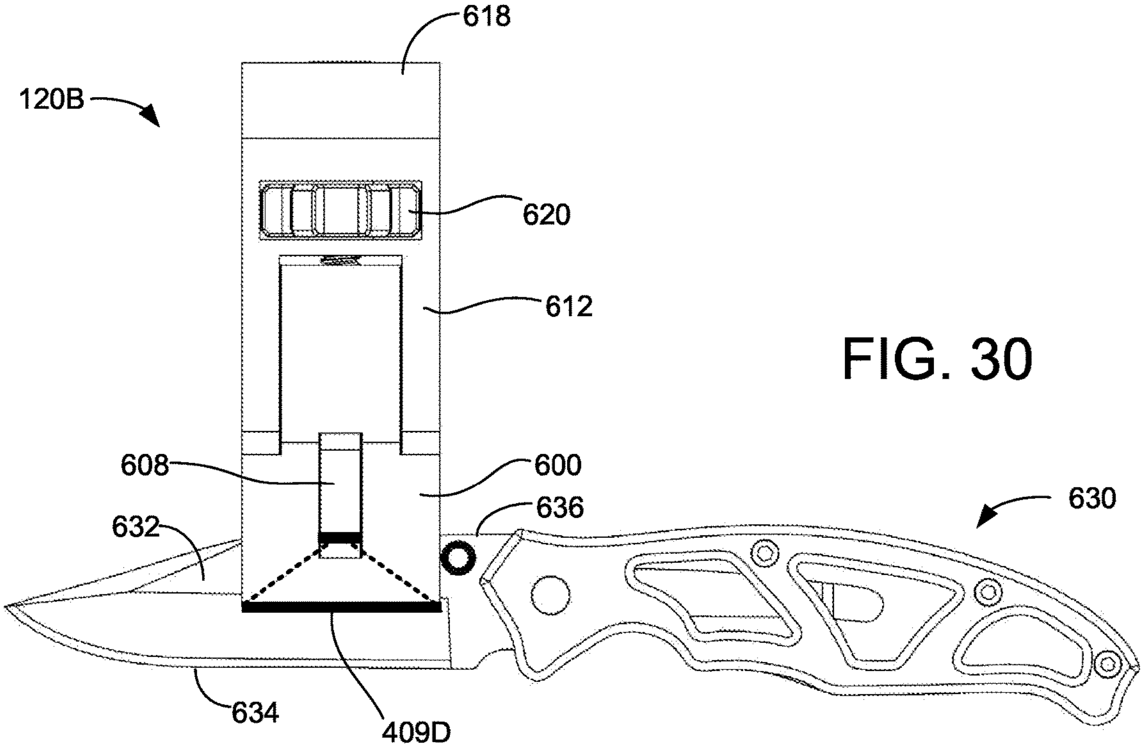
FIG. 30 is a top plan view of the blade fixture of FIG. 28 in conjunction with a cutting tool.

FIG. 30 shows the blade fixture 120B in conjunction with another knife 630 with blade 632, cutting edge 634 and spine 636. A spaced apart multi-point contact arrangement is depicted at 409D. The central guide 608 enables the user to seat the spine 636 securely and repeatably into the notch 610, and clamp the blade 632 between the respective compliant layers 604, 606.

Figure 30A:
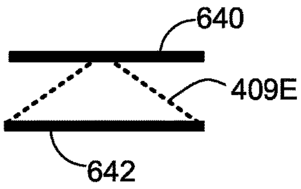
FIGS. 30A through 30C show alternative contact arrangements that can be established by further embodiments.
Figure 30B:
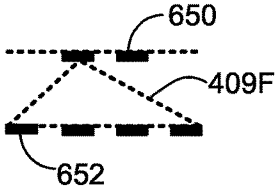
Figure 30C:
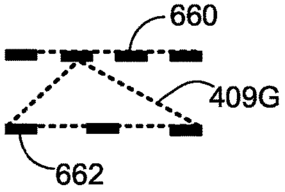

FIGS. 30A through 30C show alternative representations of contact arrangements that can be incorporated into the fixture 120B (or other configurations described herein). FIG. 30A shows a spaced apart multi-point contact arrangement 409E formed from continuously extending contacts 640 and 642. The contact 640 can be configured to interact with the upper and lower jaws to essentially span the entirety of the width of the jaws.

FIG. 30B shows an alternate spaced apart multi-point contact arrangement 409F formed from segmented contacts 650 and 652. FIG. 30C shows yet another spaced apart multi-point contact arrangement 409G formed from segmented contacts 660 and 662. Other arrangements can be used as desired.

Figure 31:
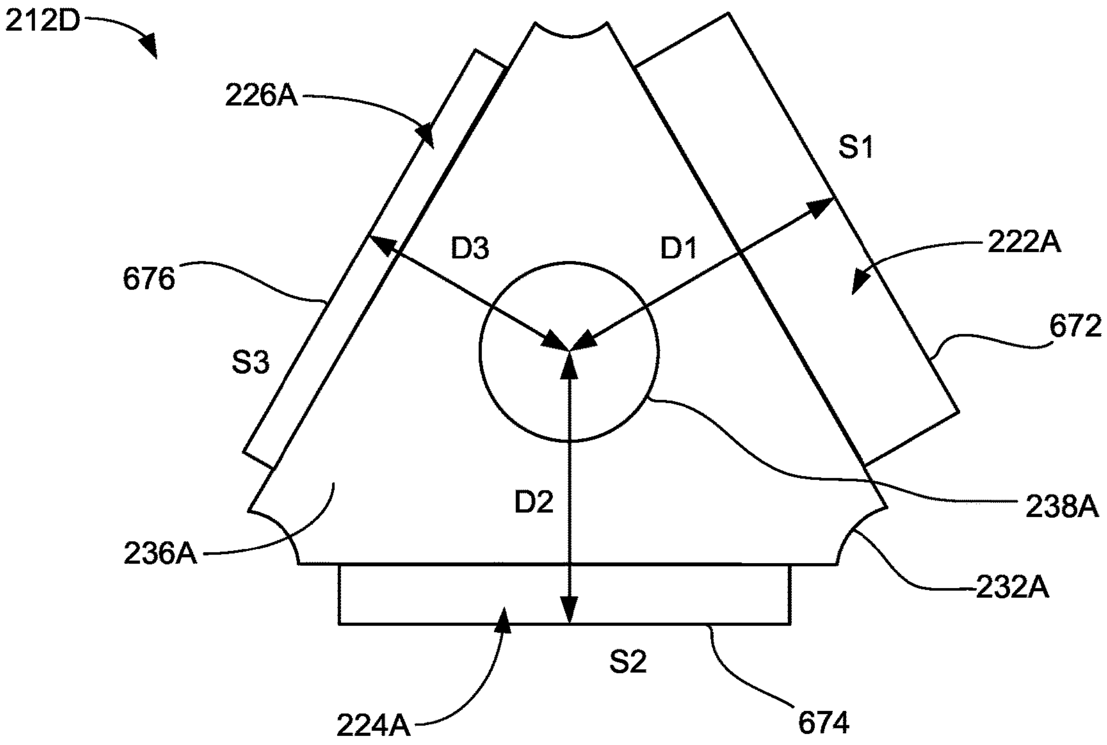
FIG. 31 is an end view representation of another sharpening cartridge in accordance with some embodiments.

FIG. 31 is a schematic depiction of another cartridge assembly 212D that utilizes further features of some embodiments. The cartridge assembly 212D is similar to the cartridge assembly 212 in FIG. 12A, and includes a total of three (3) spaced apart abrasive members 222A, 224A and 226A which are angled at nominally 60 degree intervals about a central body portion 236A with a central aperture 238A configured to accept the rod discussed above. Locking grooves 232A are provided to enable each of the respective abrasive members to be selectively presented during a sharpening operation in the manner discussed above.

Of particular interest in the configuration of FIG. 31 is the fact that the respective abrasive surfaces of the abrasive members 222A, 224A and 226A are all at different respective radial distances from the center of the aperture 238A (which corresponds to the central axis of the rod, e.g., 122 in FIG. 2B). More particularly, coarse abrasive member 222A has an outwardly facing abrasive surface 672, which is denoted as surface S1 and which is located a first distance D1 from the center of aperture 238A. The fine abrasive member 224A has an outwardly facing abrasive surface 674, which is denoted as surface S2 and which is located a different, second distance D2 from the center of aperture 238A. The honing abrasive member 226A has an outwardly facing abrasive surface 676, which is denoted as surface S3 and which is located at a third distance D3 from the center of aperture 238A.

In this schematic representation, D1>D2>D3, so that each of the surfaces S1, S2 and S3 are different physical distances from the center point, and S1 is farthest away and S3 is closest. Other arrangements can be used. The actual differences in distance have been exaggerated in FIG. 35 for purposes of clarity. It will be understood that each of the respective abrasive members 222A, 224A and 226A have been provided with different thicknesses in order to achieve the variation in the respective distances of the surfaces S1, S2 and S3. This is not necessarily required; the base assembly portion 236A can be modified as required to establish these differences in overall distance from the center point, so that any number of different thicknesses of abrasive members can be used, so long as the variation in the distance of the corresponding abrasive surfaces is achieved. It will be appreciated that while the embodiment of FIG. 31 uses three (3) abrasive members, any number of abrasive members can be positioned at different effective distances from the center point as desired.

Figure 32:
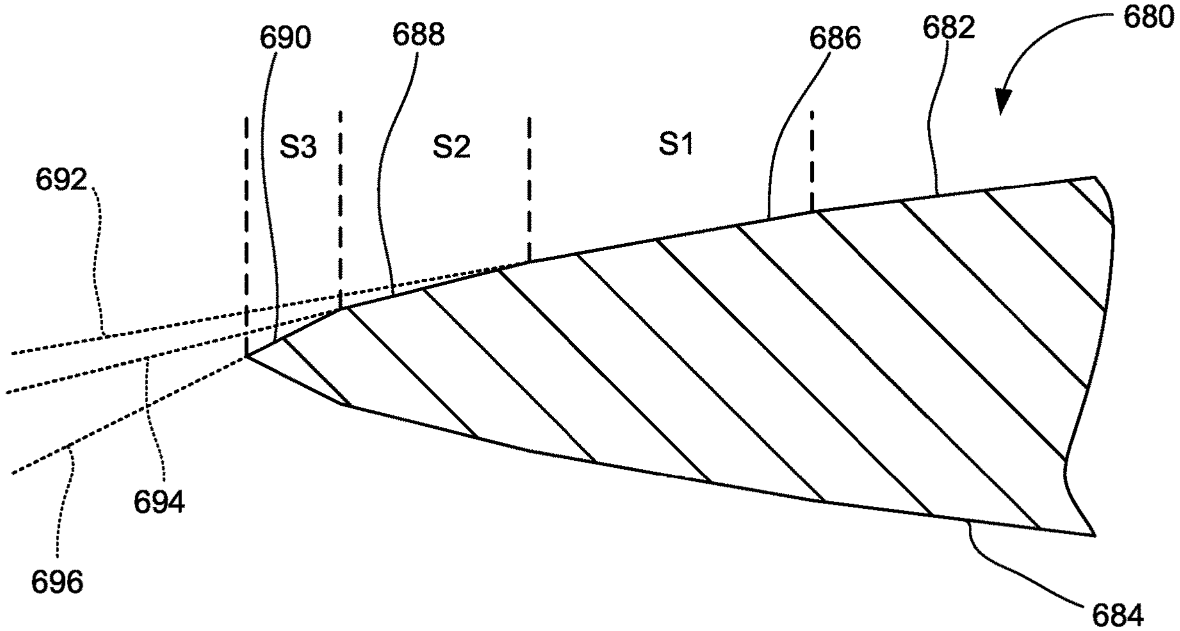
FIG. 32 shows a sharpening geometry of a cutting tool sharpened using the cartridge of FIG. 31.

FIG. 32 has been provided to demonstrate an advantageous feature of providing different abrasive surfaces such as S1, S2 and S3 (e.g., surfaces 672, 674, 676) at different respective distances from a reference point (e.g., distances D1, D2, D3). In FIG. 36, a blade 680 similar to the blades discussed above includes opposing side surfaces 682, 684, which can be grasped by opposing jaw members during a sharpening operation as described above. The geometry applied to side surface 682 is also applied to opposing side 684.

The side surface 682 has three (3) bevels, or sub-surfaces, which are generated by application of each of the respective abrasive members 222A, 224A and 226A to the side of the blade at the same selected presentation angle as determined by the base assembly 110. These bevel surfaces are respectively denoted at 686, 688 and 690. Corresponding beveled surfaces (not separately numerically denoted) have been provided to the other side 684 of the blade in turn using a similar sharpening sequence.

Of interest is the fact that each of the sharpening operations carried out using the cartridge 212D from FIG. 31 to form the surfaces 686, 688 and 690 were performed using a single setting of the adjustment mechanism 332 with respect to the base assembly 110. Stated another way, assume that the adjustment mechanism 332 of the base assembly is set to a first selected angle, such as nominally 20 degrees. The differences in relative distance D1, D2 and D3 of the associated abrasive surfaces S1, S2 and S3 would be sufficient to provide a micro-bevel geometry such as represented in FIG. 32, so that the different angles of the surfaces 686, 688 and 690 are accomplished while the same relative angle with respect to the base assembly (e.g., 110) is maintained constant (e.g., the adjustment mechanism 332 in FIG. 14B stays fixed at 20 degrees). For clarity, FIG. 32 is schematic in nature to describe the operation of the system and is not necessarily drawn to scale.

Continuing with FIG. 32, a first sharpening operation to form the first bevel 686 using surface S1 is carried out at a first effective sharpening angle as depicted by broken line 692. A second sharpening operation to form the second bevel 688 using surface S2 is carried out at a second effective sharpening angle as depicted by broken line 694. A third sharpening operation to form the third bevel 690 using surface S3 is carried out at a third effective sharpening angle as depicted by broken line 696.

As noted above, no adjustments in the vertical location of the distal end of the sharpening rod need take place during each of these sharpening operations. Instead, the differences in the distances D1, D2 and D3 provide the microbeveling capabilities illustrated in FIG. 32. Similar operations are applied sequentially to the underside 684 to obtain the overall blade geometry. Accordingly, it is contemplated that at least some variations of the sharpener 100 disclosed herein may have no adjustments in sharpening angle capabilities at all, relying on other features as described herein to provide desired shaping profiles.

It will now be understood that the various embodiments presented herein present a number of advantages and benefits over the existing art. The blade fixture as embodied herein provides an effective and secure clamping mechanism to enable repeatable clamping of a blade to be sharpened. The guide features, when utilized, enhance stability of the clamped blade as well as repeatability of a fixed known position. The abrasive assembly enables user selection of multiple different abrasive surfaces, and provides a safe and effective mechanism for user manipulation of the abrasive away from the cutting edge. The base assembly provides precise adjustments of sharpening angle, as well as safe and convenient rotation of the cutting edge to enable opposing sides of the blade to be quickly and easily sharpened.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A sharpener for sharpening a cutting edge of a cutting tool, the sharpener comprising:

a base assembly comprising a tower assembly, the tower assembly comprising:

a base portion;

first and second vertical support rails extending from the base portion;

a horizontal support rail connected between the first and second vertical support rails opposite the base portion;

a threaded shaft that is configured for selective rotation;

a non-threaded shaft; and an adjustment mechanism movably mounted on the threaded shaft and the non-threaded shaft, the adjustment mechanism being configured to move along lengths of the threaded shaft and the non-threaded shaft upon rotation of the threaded shaft;

an abrasive assembly including a rod, wherein the adjustment mechanism is configured to receive and support a first end of the rod and a blade fixture connectable to the base assembly and configured to secure a blade of the cutting tool, a distance between the blade fixture and the adjustment mechanism being selectively adjustable by movement of the adjustment mechanism.

2. The sharpener of claim 1, wherein the threaded shaft and the non-threaded shaft extend between the base portion and the horizontal support rail.

3. The sharpener of claim 1, wherein the blade fixture comprises opposing jaw members configured to grasp opposing sides of the blade.

4. The sharpener of claim 3, wherein the blade fixture comprises:

one or more support plates; and one or more alignment guides.

5. The sharpener of claim 3, wherein the blade fixture comprises a retraction mechanism connected to the opposing jaws and configured to selectively adjust a compressive force applied to the blade.

6. The sharpener of claim 1, wherein the adjustment mechanism comprises:

a threaded member configured to receive the threaded shaft therein;

a non-threaded member configured to receive the non-threaded shaft therein; and a central member connected between the threaded member and the non-threaded member.

7. The sharpener of claim 1, wherein the rod is pivotably coupled to the adjustment mechanism.

8. The sharpener of claim 1, wherein movement of the adjustment mechanism along the threaded shaft changes an angular orientation of the rod relative to the blade fixture.

9. A sharpener for sharpening a cutting edge of a cutting tool, the sharpener comprising:

a tower assembly including a base portion, a horizontal support rail spaced apart from the base portion, a threaded shaft and a non-threaded shaft extending between the base portion and the horizontal support rail, and an adjustment mechanism movably supported by the threaded shaft and the non-threaded shaft;

a blade fixture configured to secure a blade of the cutting tool relative to the tower assembly; and an abrasive assembly comprising a rod and an abrasive member supported by the rod, the rod having a first end coupled or couplable to the adjustment mechanism, wherein the adjustment mechanism is configured to move along the threaded shaft and the non-threaded shaft in response to rotation of the threaded shaft to change a position of the first end of the rod relative to the blade fixture, thereby adjusting a sharpening angle between the abrasive member and the blade.

10. The sharpener of claim 9, wherein the first end of the rod is pivotably coupled to the adjustment mechanism.

11. The sharpener of claim 10, wherein the first end of the rod is coupled to the adjustment mechanism via a ball-and-socket joint.

12. The sharpener of claim 9, wherein the first end of the rod comprises an engagement mechanism and the adjustment mechanism comprises a receptacle configured to receive the engagement mechanism.

13. The sharpener of claim 12, wherein the adjustment mechanism includes a magnetic element configured to retain the engagement mechanism within the receptacle.

14. A sharpening system comprising:

a base assembly comprising a receiving slot, a threaded shaft, a non-threaded shaft, and an adjustment mechanism movably supported on the threaded shaft and the non-threaded shaft;

a blade fixture removably insertable into the receiving slot and configured to secure a blade of a cutting tool;

an abrasive assembly comprising a rod and an abrasive member supported by the rod, the adjustment mechanism being configured to support a first end of the rod, wherein the adjustment mechanism is selectively movable along the threaded shaft and the non-threaded shaft to change a position of the first end of the rod relative to the blade fixture to thereby adjust a sharpening angle between the abrasive member and the blade, and wherein insertion of the blade fixture into the receiving slot establishes a fixed positional relationship between the blade fixture and the base assembly such that adjustment of the sharpening angle does not alter the positional relationship between the blade fixture and the receiving slot.

15. The sharpening system of claim 14, wherein the first end of the rod is pivotably coupled to the adjustment mechanism.

16. The sharpening system of claim 14, wherein the first end of the rod includes an engagement mechanism configured to be coupled to the adjustment mechanism.

17. The sharpening system of claim 16, wherein the engagement mechanism is configured to be received within a receptacle of the adjustment mechanism.

18. The sharpening system of claim 17, wherein the adjustment mechanism includes a magnetic element configured to retain the engagement mechanism within the receptacle.

19. The sharpening system of claim 16, wherein the engagement mechanism comprises a ball-and-socket joint.

* * * * *